(12) United States Patent
Mekala et al.

(10) Patent No.: US 7,722,684 B2
(45) Date of Patent: May 25, 2010

(54) ROLL-GOOD FUEL CELL FABRICATION PROCESSES, EQUIPMENT, AND ARTICLES PRODUCED FROM SAME

(75) Inventors: David Robert Mekala, Maplewood, MN (US); Donald George Peterson, Shoreview, MN (US); Dennis Earl Ferguson, Mahtomedi, MN (US); Duane Douglas Fansler, Dresser, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/676,586

(22) Filed: Feb. 20, 2007

(65) Prior Publication Data

US 2007/0141436 A1    Jun. 21, 2007

Related U.S. Application Data

(62) Division of application No. 10/446,485, filed on May 28, 2003, now Pat. No. 7,195,690.

(51) Int. Cl.
*H01M 4/82* (2006.01)
*B29C 65/00* (2006.01)
*H01M 2/08* (2006.01)
*H01M 2/14* (2006.01)

(52) U.S. Cl. .............. 29/623.2; 29/623.4; 156/256; 429/36; 429/38

(58) Field of Classification Search ............ 429/32, 429/36, 38; 156/60, 250, 256; 29/623.2, 29/623.4
See application file for complete search history.

(56) References Cited

U.S. PATENT DOCUMENTS 2,710,234 A    6/1955    Hansen
3,178,041 A    4/1965    Wheat et al.

(Continued)

FOREIGN PATENT DOCUMENTS

AT    314 323 B    3/1974

(Continued)

OTHER PUBLICATIONS

Monkman, G. J.; "Robot Grippers for Use With Fibrous Materials", *International Journal of Robotics Research*, Sage Science Press, Thousand Oaks, vol. 14, No. 2, Apr. 1, 1995, pp. 144-151.

(Continued)

*Primary Examiner*—Patrick Ryan
*Assistant Examiner*—Muhammad Siddiquee

(57) ABSTRACT

Fabricating roll-good fuel cell material involves laminating first and second bonding material webs having spaced apart windows to first and second surfaces of a fuel cell membrane web. First and second active regions of the membrane web are positioned within the respective bonding material windows. Third and fourth gasket material webs having spaced apart windows are respectively laminated to the bonding material on the first and second membrane web surfaces. The bonding material windows align with the respective gasket material windows so that at least some of the bonding material extends within the respective gasket material windows. Fluid transport layer (FTL) material portions cut from fifth and sixth FTL material webs are laminated to the respective first and second active regions. The FTL material portions are positioned within respective gasket material windows and contact the bonding material extending within the respective gasket material windows.

31 Claims, 16 Drawing Sheets

U.S. PATENT DOCUMENTS

| | | | |
|---|---|---|---|
| 3,285,112 A | 11/1966 | Dale et al. |
| 3,291,282 A | 12/1966 | Pedagno |
| 3,359,046 A | 12/1967 | Dryden |
| 3,380,788 A | 4/1968 | Wilcock |
| 3,477,558 A | 11/1969 | Fleischauer |
| 3,539,177 A | 11/1970 | Schwenk et al. |
| 3,785,638 A | 1/1974 | Beazley |
| 3,861,259 A | 1/1975 | Hitch |
| 3,946,920 A | 3/1976 | Jordan et al. |
| 4,112,827 A | 9/1978 | Kang |
| 4,143,871 A | 3/1979 | Blessing |
| 4,168,772 A | 9/1979 | Eberle |
| 4,200,016 A | 4/1980 | Helmig et al. |
| 4,236,814 A | 12/1980 | Tonkin |
| 4,286,467 A | 9/1981 | Kober |
| 4,360,260 A | 11/1982 | Eloranta et al. |
| 4,362,380 A | 12/1982 | Dragstedt |
| 4,381,596 A | 5/1983 | Simonton et al. |
| 4,428,793 A | 1/1984 | Sato et al. |
| 4,534,549 A | 8/1985 | Eberle |
| 4,591,139 A | 5/1986 | Engelbart |
| 4,636,276 A | 1/1987 | Nozaka |
| 4,668,324 A | 5/1987 | Burns |
| 4,676,862 A | 6/1987 | Kuchnert |
| 4,720,227 A | 1/1988 | Eberle |
| 4,728,093 A | 3/1988 | Eberle |
| 4,784,380 A | 11/1988 | Eberle |
| 4,819,928 A | 4/1989 | Osborn et al. |
| 4,887,858 A | 12/1989 | Gazzarrini |
| 5,031,002 A | 7/1991 | Yaguchi |
| 5,048,182 A | 9/1991 | Robbins, III |
| 5,061,337 A | 10/1991 | Fraser |
| 5,063,415 A | 11/1991 | Ariyama |
| 5,078,375 A | 1/1992 | Steidinger |
| 5,133,543 A | 7/1992 | Eitel et al. |
| 5,140,872 A | 8/1992 | Holliday et al. |
| 5,256,030 A | 10/1993 | Tanaka et al. |
| 5,334,431 A | 8/1994 | Longtin |
| 5,366,174 A | 11/1994 | Tsukamoto et al. |
| 5,456,871 A | 10/1995 | Harada et al. |
| 5,556,499 A | 9/1996 | Clough |
| 5,588,967 A | 12/1996 | Lemp et al. |
| 5,596,897 A | 1/1997 | Payne, Jr. et al. |
| 5,601,682 A | 2/1997 | Longtin |
| 5,761,793 A | 6/1998 | Bevers et al. |
| 5,762,753 A | 6/1998 | Clough |
| 5,783,024 A | 7/1998 | Forkert |
| 5,788,796 A | 8/1998 | Look et al. |
| 5,791,185 A | 8/1998 | Bodnar |
| 5,810,350 A | 9/1998 | Pollich |
| 5,899,341 A | 5/1999 | Irita |
| 5,910,378 A | 6/1999 | Debe et al. |
| 5,989,386 A | 11/1999 | Elliott |
| 5,989,747 A | 11/1999 | Tanaka et al. |
| 6,007,660 A | 12/1999 | Forkert |
| 6,042,959 A | 3/2000 | Debe et al. |
| 6,059,003 A | 5/2000 | Wittkopf |
| 6,066,409 A | 5/2000 | Ronne et al. |
| 6,159,327 A | 12/2000 | Forkert |
| 6,197,147 B1 | 3/2001 | Bonsel et al. |
| 6,210,524 B1 | 4/2001 | Josephy |
| 6,224,203 B1 | 5/2001 | Wotton et al. |
| 6,241,839 B1 | 6/2001 | Yoshino et al. |
| RE37,366 E | 9/2001 | Cox et al. |
| 6,347,585 B1 | 2/2002 | Kiamco et al. |
| 6,405,779 B1 | 6/2002 | Wittkopf |
| 6,419,217 B1 | 7/2002 | Hartmann et al. |
| 6,432,571 B1 | 8/2002 | Debe et al. |
| 6,500,217 B1 | 12/2002 | Starz et al. |
| 6,547,229 B1 | 4/2003 | Hanson et al. |
| 6,585,846 B1 * | 7/2003 | Hanson et al. ............ 156/264 |
| 6,733,912 B2 | 5/2004 | Mlinar |
| 6,740,131 B2 | 5/2004 | Schukar et al. |
| 6,742,561 B2 | 6/2004 | Nam et al. |
| 6,749,713 B2 | 6/2004 | Mlinar |
| 6,756,146 B2 | 6/2004 | Mlinar et al. |
| 6,780,276 B2 | 8/2004 | Ripley |
| 6,796,353 B2 | 9/2004 | Lang et al. |
| 6,855,178 B2 | 2/2005 | Uchida et al. |
| 6,868,890 B2 | 3/2005 | Hirsch |
| 2002/0014509 A1 | 2/2002 | Kitai et al. |
| 2002/0050200 A1 | 5/2002 | Matsumoto et al. |
| 2002/0134501 A1 | 9/2002 | Fan et al. |
| 2002/0136940 A1 | 9/2002 | Mao et al. |
| 2002/0164518 A1 * | 11/2002 | Wilkinson et al. ............ 429/34 |
| 2003/0145697 A1 | 8/2003 | Hixon et al. |
| 2003/0188615 A1 | 10/2003 | Ripley |
| 2003/0188616 A1 | 10/2003 | Behymer |
| 2003/0190226 A1 | 10/2003 | Eaton et al. |
| 2003/0191021 A1 | 10/2003 | Ripley et al. |
| 2003/0221311 A1 | 12/2003 | Smith et al. |
| 2004/0241525 A1 | 12/2004 | Mekala et al. |
| 2005/0039851 A1 | 2/2005 | Hirsch |
| 2005/0126407 A1 | 6/2005 | Hixon et al. |

FOREIGN PATENT DOCUMENTS

| | | |
|---|---|---|
| BE | 1007774 A3 | 10/1995 |
| DE | 19 28 110 A | 12/1970 |
| DE | 26 10 628 A | 9/1977 |
| DE | 33 43 811 A1 | 6/1985 |
| DE | 41 12379 A1 | 10/1992 |
| DE | 94 00 890.6 U1 | 3/1994 |
| DE | 195 48 422 A1 | 9/1997 |
| EP | 0 654 347 A1 | 11/1994 |
| EP | 1 037 295 A1 | 9/2000 |
| EP | 1 473 793 A2 | 11/2004 |
| FR | 2 456 613 A | 12/1980 |
| GB | 1 084 597 A | 9/1967 |
| GB | 2101098 A | 1/1983 |
| JP | 55-98040 | 7/1980 |
| JP | 57-93854 | 6/1982 |
| JP | 61-061367 | 3/1986 |
| JP | 62-244830 | 10/1987 |
| JP | 403-128851 | 5/1991 |
| JP | 403-128853 | 5/1991 |
| JP | 96335462 A | 12/1996 |
| JP | 10-166014 | 6/1998 |
| JP | 11 273663 A | 10/1999 |
| JP | 11 292327 | 10/1999 |
| JP | 11 297314 A | 10/1999 |
| JP | 99292327 A | 10/1999 |
| JP | 2000-090944 | 3/2000 |
| JP | 2001/236971 | 8/2001 |
| NL | 6 415 053 A | 6/1966 |
| WO | WO 01/10701 A2 | 2/2001 |
| WO | WO 02/43171 A2 | 5/2002 |
| WO | WO 02/43179 A1 | 5/2002 |

OTHER PUBLICATIONS

Ferris, T. L. J., "Design of Two Ultrasonic Distance Measurement System", *The First Japanese-Australian Joint Seminar*, Mar. 16-17, 2000.

* cited by examiner

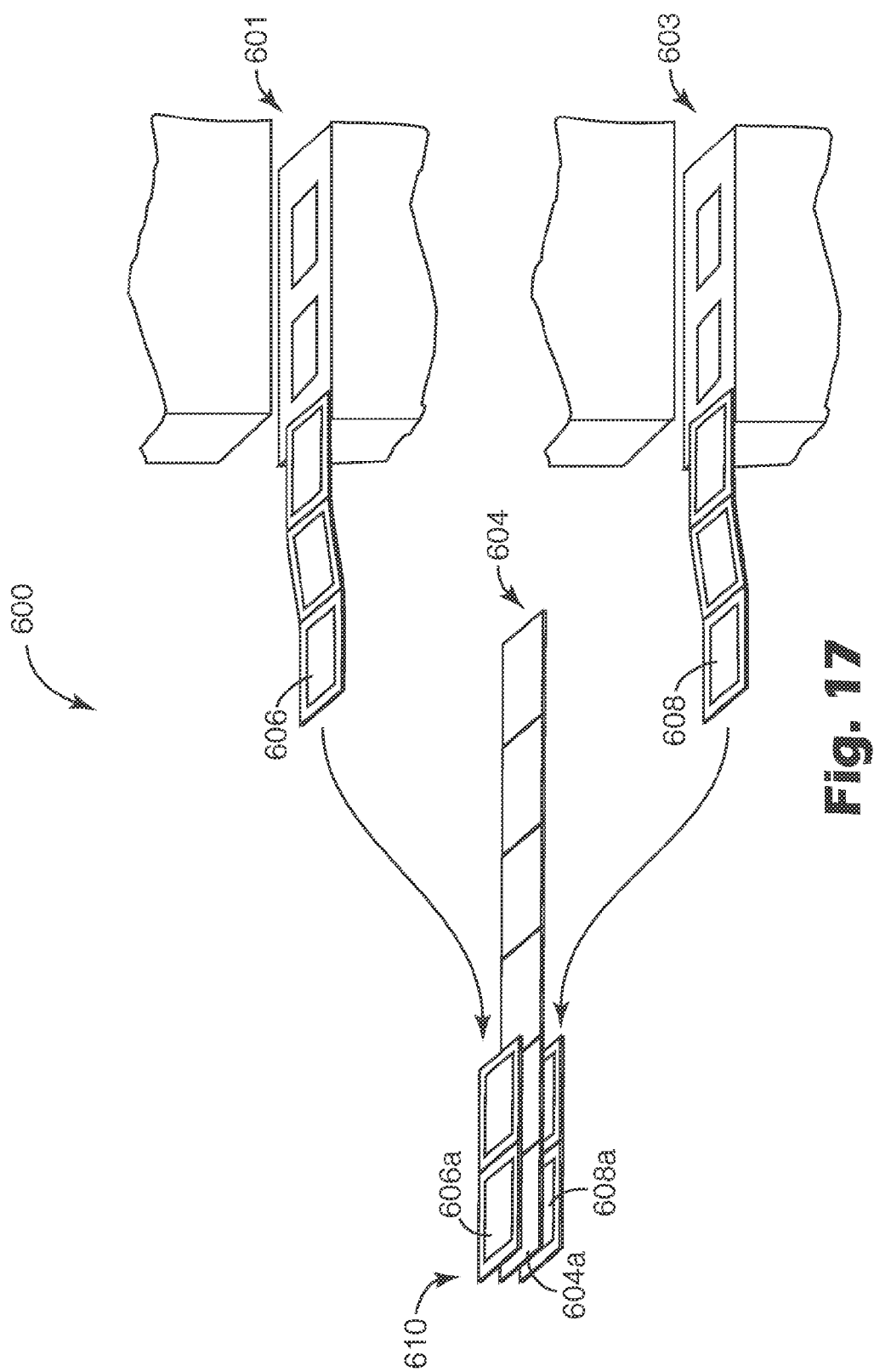

ROLL-GOOD FUEL CELL FABRICATION PROCESSES, EQUIPMENT, AND ARTICLES PRODUCED FROM SAME

CROSS REFERENCE TO RELATED APPLICATION

This application is a divisional of U.S. Ser. No. 10/446,485, filed May 28, 2003, now U.S. Pat. No. 7,195,690, the disclosure of which is incorporated by reference in its entirety herein.

FIELD OF THE INVENTION

The present invention relates generally to fuel cells and, more particularly, to processes and apparatuses for automated fabrication of multiple layer fuel cell assemblies and sub-assemblies in roll-good form, and fuel cell articles produced from same.

BACKGROUND OF THE INVENTION

Various apparatuses and methods have been developed to produce fuel cells from components developed in web or roll form. Conventional assembling approaches typically involve cutting several of the input web components to form stacks of such material in batch operations. The singulated materials are then manipulated using various mechanical and vacuum means to properly position the singulated materials during fuel cell assembly.

Although many of these processes can be automated, such approaches typically involve numerous handling, registration, and alignment steps performed by complex, time consuming, and typically expensive automation equipment. The number and complexity of processing steps associated with conventional fuel cell manufacturing approaches typically reduces product throughput, which negatively affects the productivity of an automated fuel cell assembly line. Moreover, many conventional fuel cell fabrication apparatuses and methods are not well suited for a high degree of automation, particularly such apparatus and processes which have tight positional tolerance requirements.

There is a need for improved fuel cell manufacturing apparatuses, methodologies, and fuel cell assemblies produced from such apparatuses and methodologies. There is a further need for such apparatuses, methodologies, and fuel cell assemblies that can be implemented in an automated assembly environment, such as in an automated fuel cell assembly plant. The present invention fulfills these and other needs, and addresses other deficiencies in prior approaches.

SUMMARY OF THE INVENTION

The present invention is directed to improved fuel cell fabrication processes, equipment, and articles produced from same. The present invention is further directed to automated fabrication of multiple layer fuel cell assemblies and sub-assemblies in roll-good form, including unitized fuel cell assemblies in roll-good form.

In accordance with one embodiment of the present invention, a method of continuously producing a multiple layer web of fuel cell material involves laminating first and second webs, each comprising bonding material and having spaced apart windows, to first and second surfaces of a web comprising a fuel cell membrane. First and second active regions of the membrane web are positioned within the respective bonding material windows. The method further involves laminating third and fourth webs, each comprising a gasket material and having spaced apart windows, respectively to the bonding material disposed on the first and second surfaces the membrane web. The windows of the bonding material align with the respective windows of the gasket material so that at least some of the bonding material extends within the respective gasket material windows. The method also involves laminating fluid transport layer (FTL) material portions cut from fifth and sixth webs comprising FTL material to the respective first and second active regions of the membrane web. The FTL material portions are positioned within respective gasket material windows and contact the bonding material extending within the respective gasket material windows.

According to another embodiment, a method of continuously producing a multiple layer web of fuel cell material for use with and between a pair of flow field plates or between gasket layers involves cutting a first web comprising bonding material to produce spaced apart first windows in the first web. The first windows include bonding sites provided along a periphery of the first windows. A second web comprising bonding material is cut to produce spaced apart second windows in the second web. The second windows also include bonding sites provided along a periphery of the second windows.

The method further involves providing a web comprising a fuel cell membrane having active regions disposed on respective first and second surfaces of the membrane web, and laminating a first surface of the first bonding material web to the first surface of the membrane web so that the active regions of the first surface of the membrane web are positioned within the first windows. A first surface of the second bonding material web is laminated to the second surface of the membrane web so that the active regions of the second surface of the membrane web are positioned within the second windows. The method also involves laminating FTL material portions cut from fourth and fifth webs comprising FTL material to the active regions of the respective first and second surfaces of the membrane web. Each of the FTL material portions contact the bonding sites of the respective first and second windows.

In accordance with a further embodiment, a method of continuously producing multiple layer fuel cell assemblies involves processing a web of membrane material, a first bonding web, and a first web comprising FTL material to form a first surface of a membrane electrode assembly (MEA) web. The method also involves processing the web of membrane material, a second bonding web, and a second web comprising FTL material to form a second surface of the MEA web. First and second flow field plates are provided, preferably in the form of first and second flow field plate webs. The method further involves encasing each MEA of the MEA web between a respective pair of the first and second flow field plates.

According to another embodiment, a method of continuously producing multiple layer fuel cell assemblies involves producing a continuous MEA web. A first web comprising bonding material having spaced apart first windows is provided, wherein the first windows include bonding sites provided along a periphery of the first windows. A second web comprising bonding material having spaced apart second windows is provided. The second windows include bonding sites provided along a periphery of the second windows. A web comprising a fuel cell membrane having active regions disposed on respective first and second surfaces of the membrane web is also provided.

The method also involves laminating a first surface of the first bonding material web to the first surface of the membrane web so that the active regions of the first surface of the membrane web are positioned within the first windows, and laminating a first surface of the second bonding material web to the second surface of the membrane web so that the active regions of the second surface of the membrane web are positioned within the second windows. FTL material portions cut from fourth and fifth webs comprising FTL material are laminated to the active regions of the respective first and second surfaces of the membrane web, wherein each of the FTL material portions contact the bonding sites of the respective first and second windows.

The method further involves providing a continuous web of first flow field plates and providing a continuous web of second flow field plates. Each of the MEAs is encased between a respective pair of the first and second flow field plates.

In accordance with yet another embodiment, an apparatus for continuously producing a multiple layer web of fuel cell material includes a first cutting station configured for cutting a first web comprising bonding material. The first cutting station includes a first cutting mechanism configured to produce spaced apart first windows in the first web. The first windows include bonding sites provided along a periphery of the first windows. A second cutting station is configured for cutting a second web comprising bonding material. The second cutting station includes a second cutting mechanism configured to produce spaced apart second windows in the second web. The second windows include bonding sites provided along a periphery of the second windows.

The apparatus also includes a membrane web transport mechanism configured to transport a membrane web. The membrane web comprises a fuel cell membrane having active regions disposed on respective first and second surfaces of the membrane web. A first laminating station is configured to laminate a first surface of the first bonding material web to the first surface of the membrane web so that the active regions of the first surface of the membrane web are positioned within the first windows. A second laminating station is configured to laminate a first surface of the second bonding material web to the second surface of the membrane web so that the active regions of the second surface of the membrane web are positioned within the second windows.

The apparatus further includes a third laminating station configured to laminate first FTL patches to the active regions of the first surface of the membrane web, such that each of the first FTL patches contact the bonding sites of the first windows. A fourth laminating station is configured to laminate second FTL patches to the active regions of the second surface of the membrane web, such that each of the second FTL patches contact the bonding sites of the second windows.

According to a further embodiment, a fuel cell assembly includes a membrane having a first surface and a second surface. The first and second surfaces include first and second active regions, respectively. A first bonding layer includes a first surface in contact with the first surface of the membrane and comprises a first window in alignment with the first active region of the membrane. The first window includes protrusions of bonding material in contact with the first active region.

A second bonding layer of the fuel cell assembly has a first surface in contact with the second surface of the membrane and includes a second window in alignment with the second active region of the membrane. The second window includes protrusions of bonding material in contact with the second active region.

A first gasket layer is disposed on a second surface of the first bonding layer and includes a third window in alignment with the first window of the first bonding layer. A second gasket layer is disposed on a second surface of the second bonding layer and includes a fourth window in alignment with the second window of the second bonding layer.

The fuel cell assembly also includes a first FTL in contact with the first surface of the membrane, wherein a peripheral edge of the first FTL contacts at least the bonding material protrusions of the first window. A second FTL is in contact with the second surface of the membrane, such that a peripheral edge of the second FTL contacts at least the bonding material protrusions of the second window. An anode catalyst is disposed at one of the first and second active regions, and a cathode catalyst is disposed at the other of the first and second active regions.

In accordance with another embodiment, a fuel cell sub-assembly for use with and between a pair of flow field plates or between gasket layers includes a membrane having a first surface and a second surface. The first and second surfaces includes first and second active regions, respectively. A first bonding layer has a first surface in contact with the first surface of the membrane and includes a first window in alignment with the first active region of the membrane. The first window includes protrusions of bonding material in contact with the first active region. A second bonding layer of the fuel cell sub-assembly has a first surface in contact with the second surface of the membrane and includes a second window in alignment with the second active region of the membrane. The second window includes protrusions of bonding material in contact with the second active region.

The fuel cell sub-assembly also includes a first FTL in contact with the first surface of the membrane, wherein a peripheral edge of the first FTL contacts at least the bonding material protrusions of the first window. A second FTL is in contact with the second surface of the membrane, wherein a peripheral edge of the second FTL contacts at least the bonding material protrusions of the second window. An anode catalyst is disposed at one of the first and second active regions, and a cathode catalyst is disposed at the other of the first and second active regions.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 17 is an illustration of a molding system and process for producing molded unitized fuel cell assemblies in accordance with a continuous fuel cell manufacturing process of the present invention.

Figure 1:
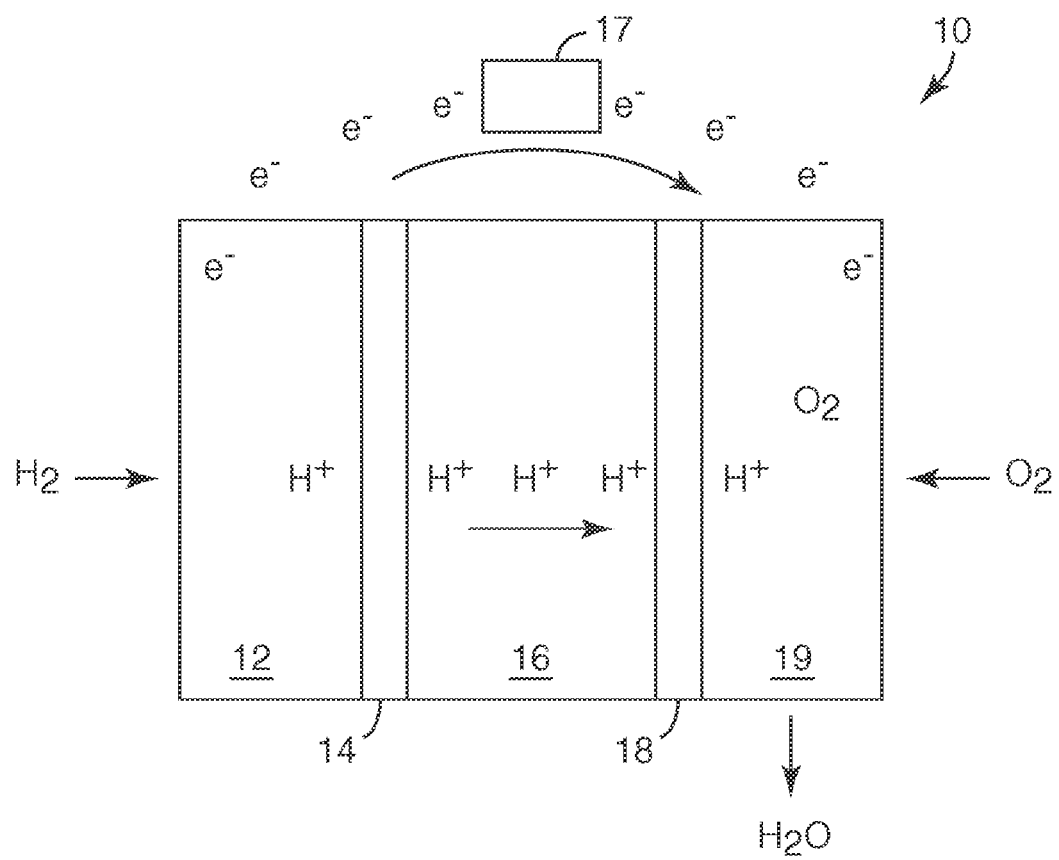
FIG. 1 depicts a typical fuel cell and its basic operation.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to improved methods and apparatuses for constructing fuel cell structures, and to improved fuel cell assemblies. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

A typical fuel cell is depicted in FIG. 1. The fuel cell 10 shown in FIG. 1 includes a first fluid transport layer (FTL) 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. The FTLs 12 and 19 can be referred to as diffuse current collectors (DCCs) or gas diffusion layers (GDLs). In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

A number of individual fuel cells, such as that shown in FIG. 1, can be produced from roll-good input materials (e.g., webs of fuel cell components) in accordance with the principles of the present invention. For example, individual fuel cells can be fabricated using a continuous assembling approach by which roll-good input web materials are processed to produce a roll-good output web of complete fuel cell assemblies. In certain approaches, roll-good input web materials can be processed to produce a roll-good output web of fuel cell sub-assemblies, which can be used in a subsequent process to produce complete fuel cell assemblies.

Output fuel cell assembly and sub-assembly webs can be wound with appropriate liner material to form a roll. In another approach, output fuel cell assembly and sub-assembly webs can be subject to a singulation process, by which individual fell cell assemblies or sub-assemblies are separated from their respective webs.

According to other approaches, roll-good fuel cell input web materials and flow field plates can be processed to produce unitized fuel cell assemblies (UCAs) in a continuous manner. A unitized fuel cell assembly is a unitary module or unit that comprises one or more cells that can work as a functioning fuel cell alone or in conjunction with other UCAs in a stack. UCAs can be implemented in a monopolar or bipolar configuration.

In one approach, for example, roll-good fuel cell input web materials and webs of flow field plates can be processed to produce a web of UCAs. The webs of flow field plates can be produced using an in-line molding process by which flow field plates are molded during, before, or after fuel cell web processing and are used to encase membrane electrode assemblies (MEAs) of the output web. UCAs can be rolled or singulated and stacked for ease of handling and future use.

A number of different fuel cell technologies can be employed to construct fuel cell assemblies, sub-assemblies, and UCAs in accordance with the principles of the present invention. For example, a fuel cell fabrication methodology of the present invention can be employed to construct proton exchange membrane (PEM) fuel cell assemblies and sub-assemblies. PEM fuel cells operate at relatively low temperatures (about 175° F./80° C.), have high power density, can vary their output quickly to meet shifts in power demand, and are well suited for applications where quick startup is required, such as in automobiles for example.

The proton exchange membrane used in a PEM fuel cell is typically a thin plastic sheet that allows hydrogen ions to pass through it. The membrane is typically coated on both sides with highly dispersed metal or metal alloy particles (e.g., platinum or platinum/ruthenium) that are active catalysts. The electrolyte used is typically a solid organic polymer such as poly-perfluorosulfonic acid. Use of a solid electrolyte is advantageous because it reduces corrosion and management problems.

Hydrogen is fed to the anode side of the fuel cell where the catalyst promotes the hydrogen atoms to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

A membrane electrode assembly (MEA) is the central element of PEM fuel cells, such as hydrogen fuel cells. As discussed above, typical MEAs comprise a polymer electrolyte membrane (PEM) (also known as an ion conductive membrane (ICM)), which functions as a solid electrolyte.

One face of the PEM is in contact with an anode electrode layer and the opposite face is in contact with a cathode electrode layer. Each electrode layer includes electrochemical catalysts, typically including platinum metal. Fluid transport layers (FTLs) facilitate gas transport to and from the anode and cathode electrode materials and conduct electrical current.

In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). The anode and cathode electrode layers may be applied to the PEM or to the FTL during manufacture, so long as they are disposed between PEM and FTL in the completed MEA.

Any suitable PEM may be used in the practice of the present invention. The PEM typically has a thickness of less than 50 μm, more typically less than 40 μm, more typically less than 30 μm, and most typically about 25 μm. The PEM is typically comprised of a polymer electrolyte that is an acid-functional fluoropolymer, such as Nafion® (DuPont Chemicals, Wilmington Del.) and Flemion® (Asahi Glass Co. Ltd., Tokyo, Japan). The polymer electrolytes useful in the present invention are typically preferably copolymers of tetrafluoroethylene and one or more fluorinated, acid-functional comonomers.

Typically, the polymer electrolyte bears sulfonate functional groups. Most typically, the polymer electrolyte is Nafion®. The polymer electrolyte typically has an acid equivalent weight of 1200 or less, more typically 1100 or less, more typically 1050 or less, and most typically about 1000.

Any suitable FTL may be used in the practice of the present invention. Typically, the FTL is comprised of sheet material comprising carbon fibers, such as a carbon fiber paper. The FTL is typically a carbon fiber construction selected from woven and non-woven carbon fiber constructions. Carbon fiber constructions which may be useful in the practice of the present invention may include: Toray Carbon Paper, Spectra-Carb Carbon Paper, AFN non-woven carbon cloth, Zoltek Carbon Cloth, and the like. The FTL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. The catalyst is typically applied to the PEM or to the FTL in the form of a catalyst ink. The catalyst ink typically comprises polymer electrolyte material, which may or may not be the same polymer electrolyte material which comprises the PEM.

The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols, polyalcohols, such a glycerin and ethylene glycol, or other solvents such as N-methylpyrolidone (NMP) and dimethylformamide (DMF). The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the PEM or the FTL by any suitable means, including both hand and machine methods, including hand brushing, notch bar coating, fluid bearing die coating, wire-wound rod coating, fluid bearing coating, slot-fed knife coating, three-roll coating of both anode and cathode formulations, or decal transfer of the dried catalyst coatings onto the membrane. Coating may be achieved in one application or in multiple applications.

Another fuel cell technology that can be employed to construct fuel cell assemblies, sub-assemblies, and UCAs in accordance with the principles of the present invention is referred to as direct methanol fuel cell. Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120-190° F./49-88° C. A direct methanol fuel cell can be subject to processing and packaging in accordance with the principles of the present invention.

Figure 2:
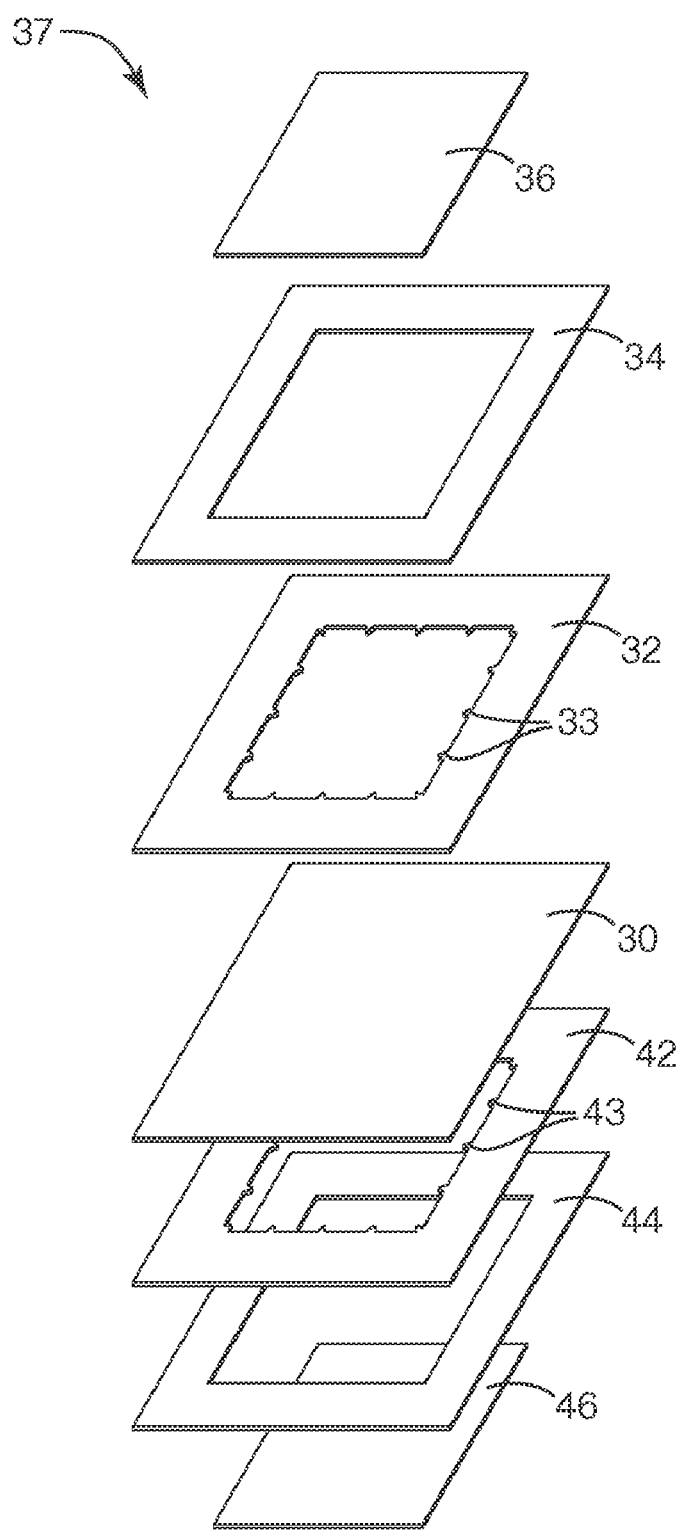
FIG. 2 is an illustration of a multiple layer fuel cell assembly constructed in accordance with an embodiment of the present invention.
Figure 3:
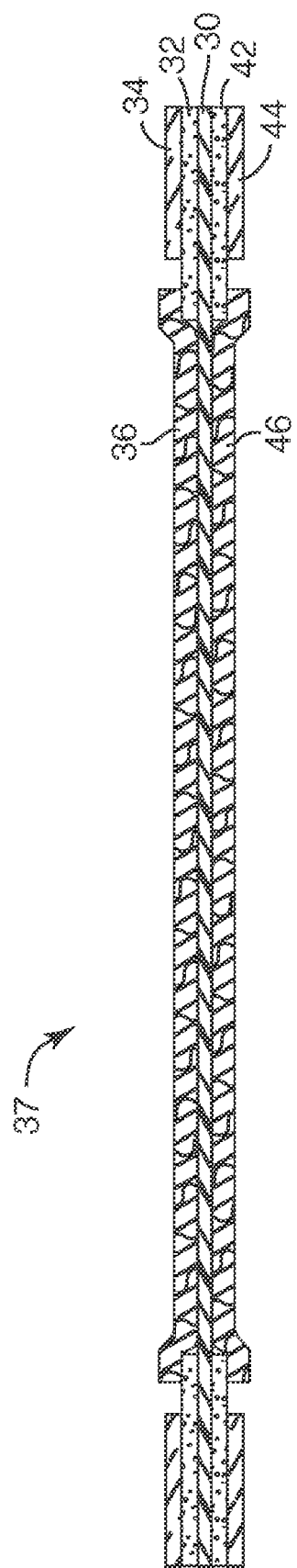
FIG. 3 is a cross-sectional view of the fuel cell assembly shown in FIG. 2.

Referring now to FIG. 2, there is illustrated an embodiment of a multiple layer fuel cell 37 in accordance with a PEM fuel cell technology. A cross-sectional view of the fuel cell embodiment of FIG. 2 is provided in FIG. 3. The fuel cell 37 shown in FIGS. 2 and 3 is a 7-layer structure, which includes a 5-layer MEA and a 2-layer gasket structure.

The fuel cell 37 includes a PEM layer 30 having surfaces to which bonding layers 32 and 42 are respectively applied. Although the bonding layers 32 and 42 are depicted as discrete members in FIG. 2, it is understood that bonding layers 32 and 42 can be formed using a solid, a liquid, or a UV or light curable material or a vaporous bonding material or agent.

The bonding layers 32 and 42 are patterned or otherwise formed to include a window having a size about equal to the active region of the PEM layer 30. The windows of the bonding layers 32 and 42 include a number of inwardly extending bonding sites 33, 43. The bonding sites 33, 43 extend into the active area of the PEM layer 30 and serve to facilitate adhering contact between the active regions of the PEM layer 30 and respective fluid transport layers (FTLs) 36 and 46, while minimizing ingression of the bonding layers 32 and 42 into the active regions of the PEM layer 30. Use of bonding sites to provide adhering contact between the PEM layer 30 and FTLs 36 and 46 can advantageously eliminate the need to subject these layers to compressive press forces at elevated temperatures for a prolonged period of time as in the case of traditional processing techniques.

In FIG. 2, the bonding sites 33, 43 are shown as a series of protrusions or fingers provided about the inner periphery of the bonding layer windows. It is understood that the bonding sites can be formed or patterned to take on a number of different configurations, and that the finger shaped bonding sites 33, 43 shown in FIG. 2 and elsewhere are for illustrative, non-limiting purposes only. For example, the bonding sites 33, 43 can define a number of edge portions of the inner periphery of the bonding layer windows. Also, the bonding sites 33, 43 can define a continuous inner peripheral edge of the bonding layer windows. These and other configurations can be employed as bonding sites 33, 43, such bonding sites contacting only a small percentage of the total active area of the PEM layer 30, such as no greater than about 15%.

Gasket layers 34 and 44 are situated to contact respective bonding layers 32 and 42. The gasket layers 34 and 44 include windows having a size larger than the widows of the bonding layers 32 and 42. The gasket layers 34 and 44 can be formed from a variety of materials, including, for example, TEFLON, fiberglass impregnated with TEFLON, an elastomeric material, UV curable polymeric material, surface texture material, multi-layered composite material, sealants, and silicon material.

In one particular embodiment, the gasket layers 34 and 44 may each be a closed-cell foam rubber gasket as disclosed in co-pending application Ser. No. 10/294,098, filed Nov. 14, 2002 and incorporated herein by reference. In other embodiments, the gasket layers 34 and 44 may be formed with a contact face having a raised-ridge microstructured sealing pattern as disclosed in co-pending application Ser. No. 10/143,273, filed May 10, 2002, and incorporated herein by reference.

The FTLs 36 and 46 are sized to fit within the windows of the gasket layers 34 and 44. Moreover, the FTLs 36 and 46 are sized to cover the inner peripheral edge of the windows of bonding layers 32 and 42, in addition to covering the bonding sites 33 and 43. Anode catalyst material (not shown) is situated between one of the two FTLs 36, 46 and the PEM layer 30, and cathode catalyst material (not shown) is situated between the PEM layer 30 and the other of the two FTLs 36, 46.

In one configuration, the PEM layer 30 is fabricated to include an anode catalyst coating on one surface and a cathode catalyst coating on the other surface. This structure is often referred to as a catalyst-coated membrane or CCM. According to another configuration, the FTLs 36, 46 are fabricated to include an anode and cathode catalyst coating, respectively. In yet another configuration, an anode catalyst coating can be disposed partially on one of the two FTLs 36, 46 and partially on one surface of the PEM layer 30, and a cathode catalyst coating can be disposed partially on the other of the two FTLs 36, 46 and partially on the other surface of the PEM layer 30.

The PEM layer 30 and FTLs 36 and 46 can have a construction as discussed above. The bonding layers 32 and 42 can be formed using a thermobond material, such as a thermosetting or a thermoplastic material. Appropriate bonding layer materials include pressure sensitive adhesives, bonding agents, self-sealing materials, and heat-activated bonding materials.

According to one embodiment, the bonding layers 32 and 46 are formed using a thermoplastic sealing material. The thermoplastic can be a fluoroplastic like THV (terpolymer of tetrafluoroethylene, hexafluoropropylene and vinylidene difluoride); polyethylene; copolymers of polyethylene such as those of ethylene and acrylic acid; Thermo-Bond 845 (manufactured by 3M, e.g., a polyethylene maleic anhydride copolymer) and Thermo-Bond 668 (manufactured by 3M, e.g., a polyester). Blends of these materials or composite materials of these with fillers such as carbon, glass, ceramic, etc. may also be used as thermoplastics. Preferably, the melt range is 50-180° C., and more preferably 100-150° C., which should be similar to the MEA bonding temperature.

Figure 4:
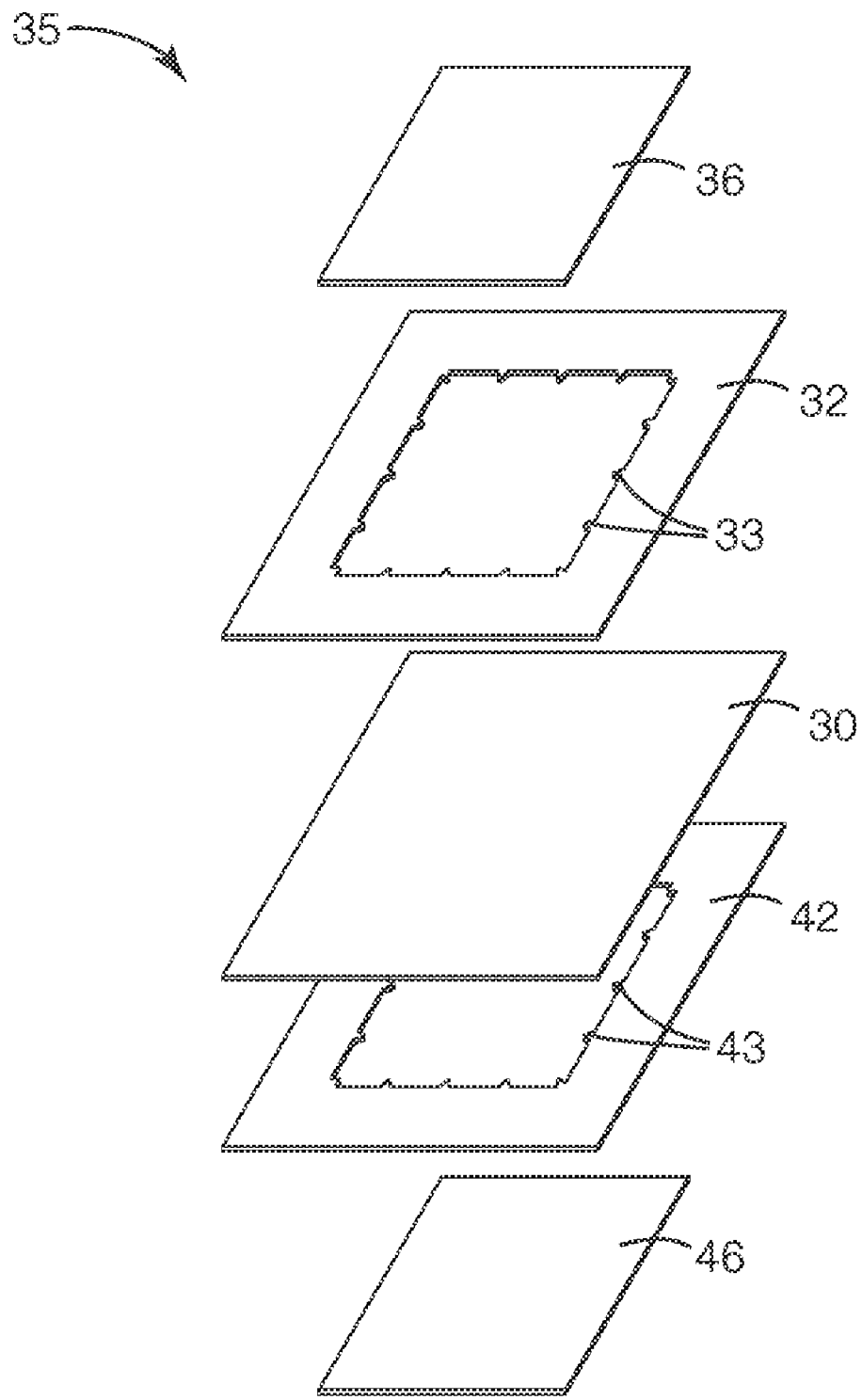
FIG. 4 is an illustration of a multiple layer fuel cell assembly constructed in accordance with another embodiment of the present invention.

FIG. 4 is an illustration of a fuel cell sub-assembly 35 in accordance with an embodiment of the present invention. The fuel cell sub-assembly 35 depicted in FIG. 4 is a unique 5-layer MEA structure that incorporates bonding layers on opposing surfaces of the membrane. As shown, the MEA of FIG. 4 incorporates several of the layers and features previously described in connection with the fuel cell assembly of FIGS. 2 and 3. In particular, the MEA of FIG. 4 includes a PEM layer 30 having surfaces to which bonding layers 32 and 42 are respectively applied. As previously described, the bonding layers 32 and 42 include a window having a size about equal to the active region of the PEM layer 30.

The windows of the bonding layers 32 and 42 include a number of inwardly extending bonding sites or fingers 33, 43. The bonding sites 33, 43 extend into the active area of the PEM layer 30 and adheringly contact portions of the active regions of the PEM layer 30 and respective fluid transport layers (FTLs) 36 and 46. The FTLs 36 and 46 are sized to fit within the windows of the gasket layers 34 and 44, and cover the inner peripheral edge of the windows of bonding layers 32 and 42, in addition to covering the bonding sites 33 and 43. An anode is situated between one of the two FTLs 36, 46 and the PEM layer 30, and a cathode is situated between the PEM layer 30 and the other of the two FTLs 36, 46.

In this embodiment, the surfaces of the bonding layers 32, 42 not in contact with the PEM layer 30 are preferably covered by a liner (not shown) or other material so that the bonding material of the bonding layers 32, 42 and the FTLs 36, 46 are not exposed until such time as exposure of same is desired in a subsequent process. Various types of release liners can be used for this purpose. In a subsequent process, the exposed bonding layers 32, 42 and FTLs 36, 46 may be registered with respective gasket layers or flow field plates, for example.

MEA structures of the type shown in FIG. 4 can be stored in appropriate manner for use in subsequent fuel cell fabrication processes, such as in the form of a roll-good or in stacks. Alternatively, these MEA structures can be subject to further automated fuel cell assembling processes, such as those described below. In cases where a release liner is used, as is discussed above, the release liner can be removed from the outer surfaces of the bonding layers/FTLs, such as by an automated process. It is noted that certain bonding materials need not be protected using a liner, such as in the case of a fuel cell assembly roll-good that incorporates certain thermobond materials.

Figure 5:
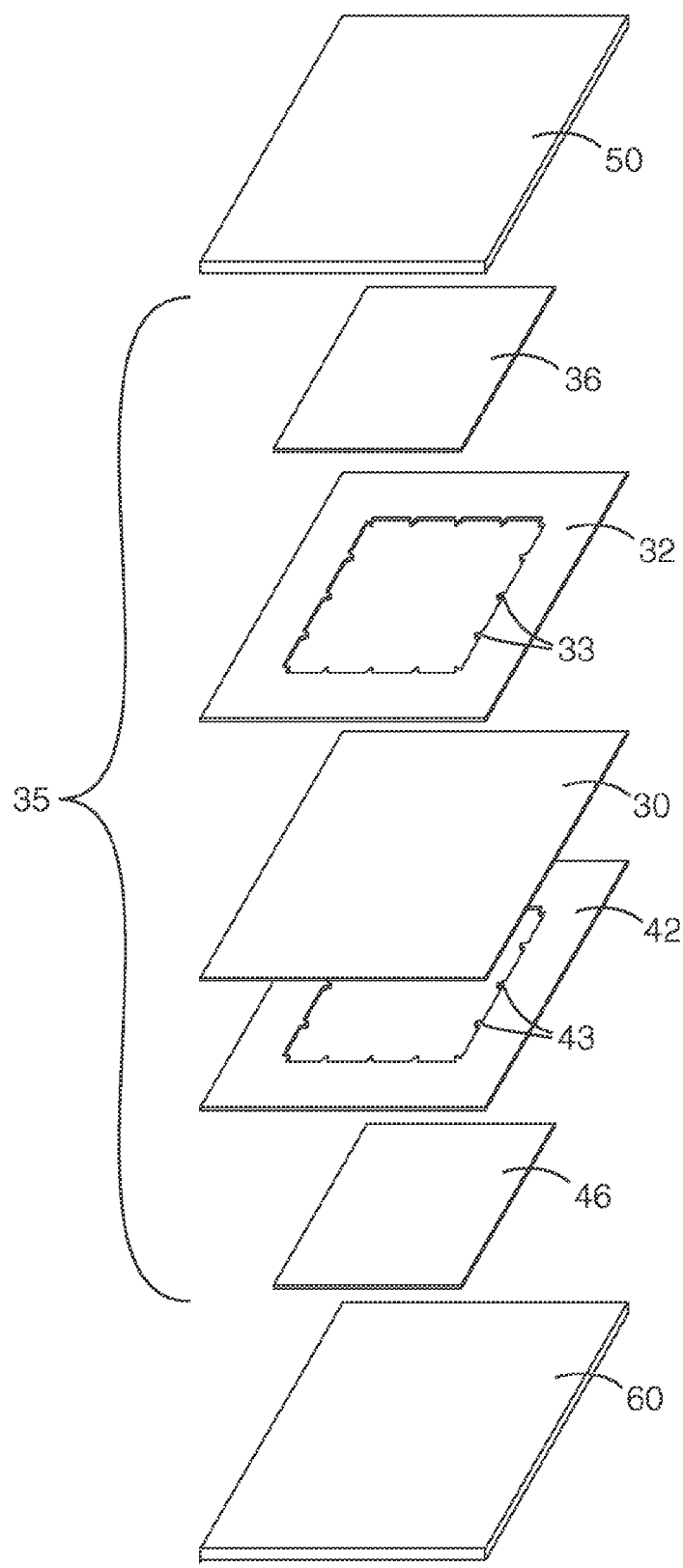
FIG. 5 is an illustration of a multiple layer fuel cell assembly constructed as a unitized fuel cell assembly or UCA in accordance with another embodiment of the present invention.

By way of example, and with reference to FIG. 5, there is illustrated an embodiment of a UCA in which an MEA 35 of the type described above is disposed between a pair of flow field plates 50 and 60. According to this embodiment, the MEA 35 includes a PEM layer 30 sandwiched between bonding layers 32 and 42 each having a window about equal in size to the active region of the PEM layer 30 and inwardly extending bonding sites or fingers 33, 43 as previously described. Two FTLs 36 and 46 are sized to fit within the windows of the gasket layers 34 and 44, and cover the inner peripheral edge of the windows of bonding layers 32 and 42, in addition to covering the bonding sites 33 and 43. Anode and cathode regions are respectively situated between the two FTLs 36, 46 and the PEM layer 30, as previously discussed.

Each of the bonding layers 32 and 42 shown in FIG. 5 has an exposed bonding surface which can be registered with a surface of a respective flow field plate 50, 60. Bonding contact between the exposed bonding surfaces of the bonding layers 32 and 42 a respective flow field plates 50 and 60 advantageously maintains accurate registration between these components during automated fuel cell assembly. Moreover, the bonding layers 32 and 42 can facilitate edge sealing of the UCA during a heated sealing process. UCA fabrication processes and structures which may incorporate process and structural features of the present invention are disclosed in co-pending application Ser. Nos. 10/295,518 and 10/295,292 filed concurrently on Nov. 15, 2002 and incorporated herein by reference.

In general terms, each of the flow field plates 50, 60 includes a field of gas flow channels and ports through which hydrogen and oxygen feed fuels pass. In certain configurations, the flow field plates 50, 60 can be configured as monopolar flow field plates, in which a single MEA 35 is sandwiched between a pair of flow field plates 50, 60 to define a UCA. The flow field in this and other embodiments may be a low lateral flux flow field as disclosed in co-pending application Ser. No. 09/954,601, filed Sep. 17, 2001, and incorporated herein by reference. In a typical configuration, the size of the flow field plates are typically about the same size as the membrane.

In other configurations, a UCA can incorporate multiple MEAs 35 through employment of one or more bipolar flow field plates. For example, a UCA can incorporate two MEAs 35 of the type described in FIG. 5 and a single bipolar flow field plate. In such a configuration, a first MEA 35 can include a bonding layer/cathode/membrane/anode/bonding layer structure sandwiched between first and second FTLs. The first FTL can be situated adjacent a first flow field end plate, which can be configured as a monopolar flow field plate. The second FTL can be situated adjacent a first flow field surface of bipolar flow field plate.

Similarly, a second MEA 35 can include a bonding layer/cathode/membrane/anode/bonding layer structure sandwiched between third and fourth FTLs. The third FTL can be situated adjacent a flow field end plate, which can be configured as a monopolar flow field plate. The fourth FTL can be situated adjacent a second flow field surface of the bipolar flow field plate. It will be appreciated that N number of MEAs 35 and N−1 bipolar flow field plates can be incorporated into a single UCA. It is believed, however, that, in general, a UCA incorporating one or two MEAs 35 is preferred for more efficient thermal management.

The UCA configurations shown in FIG. 5 and discussed herein are representative of particular arrangements that can be implemented for use in the context of the present invention. These arrangements are provided for illustrative purposes only, and are not intended to represent all possible configurations coming within the scope of the present invention. For example, an in-line molding process for producing flow field plates as described below may dictate use of certain UCA features, such as additional or enhanced sealing features, gasket features, and/or hard and soft stop features. Conversely, such an in-line molding process may provide for elimination of certain UCA features, such as elimination of a separate gasket or sealing feature by substitute use of material molded around the manifolds of the flow field plates.

By way of further example, a variety of enhanced sealing methodologies can be employed to provide the requisite sealing of a UCA comprising a single MEA disposed between a pair of monopolar flow field plates, and can also be employed to seal a UCA comprising multiple MEAs, a pair of monopolar flow field plates and one or more bipolar flow field plates. For example, a UCA having a monopolar or bipolar structure can be constructed to incorporate an in-situ formed solid gasket, such as a flat solid silicone gasket disclosed in previously incorporated application Ser. Nos. 10/295,518 and 10/295,292.

In particular embodiments, a UCA can further incorporate a hard stop arrangement. The hard stop(s) can be built-in, disposed internal to the UCA, or integrated into the monopolar and/or bipolar flow field plates. Other features can be incorporated into a UCA, such as an excess gasket material trap channel and a micro replicated pattern provided on the flow field plates. Incorporating a hard stop into the UCA packaging advantageously limits the amount of compressive force applied to the MEA during fabrication (e.g., press forces) and during use (e.g., external stack pressure system). For example, the height of a UCA hard stop can be calculated to provide a specified amount of MEA compression, such as 30%, during UCA construction, such compression being limited to the specified amount by the hard stop. Incorporating a hard stop into the flow field plates can also act as a registration aid for the two flow field plates.

Moreover, a variety of UCA configurations can be implemented with a thermal management capability in accordance with other embodiments of the present invention. By way of example, a given UCA configuration can incorporate an integrated thermal management system. Alternatively, or additionally, a given UCA can be configured to mechanically couple with a separable thermal management structure. Several exemplary UCA hard stop and thermal management approaches are disclosed in previously incorporated application Ser. Nos. 10/295,518 and 10/295,292.

Figure 6:
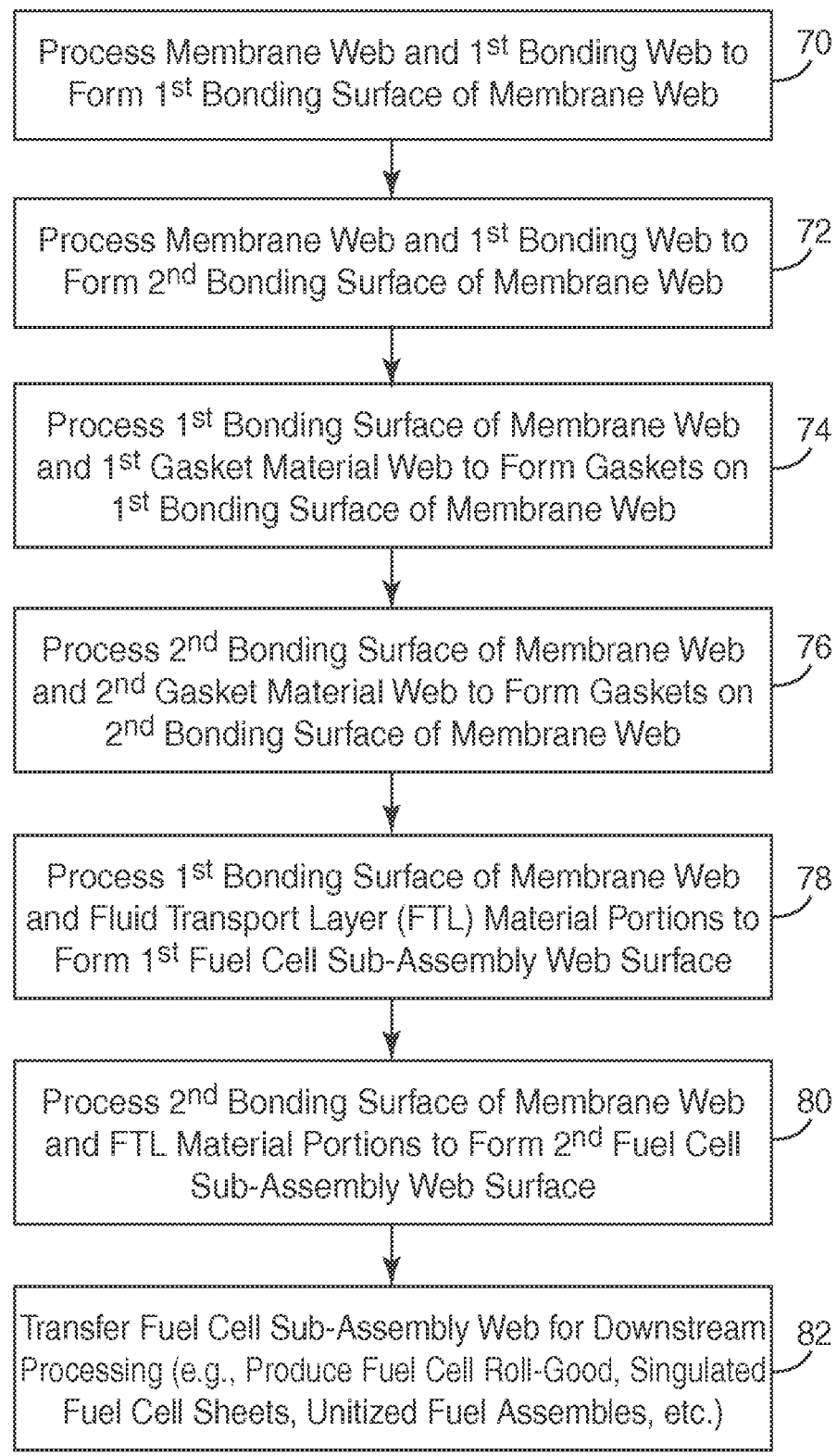
FIGS. 6-9 are flow diagrams that illustrate various processes for fabricating fuel cell assemblies, sub-assemblies, and unitized fuel cell assemblies in accordance with embodiments of the present invention.

FIGS. 6-9 depict various methodologies by which fuel cell assemblies and sub-assemblies can be produced in accordance with embodiments of the present invention. FIG. 6 illustrates various processes involving the continuous production of roll-good or singulated fuel cell sub-assemblies, such as MEAs, using roll-good input fuel cell materials. According to the embodiment of FIG. 6, a web of a membrane material, such as a web of PEM material, is processed 70 together with a first web of a bonding material to form a first bonding surface of the membrane web. A second surface of the membrane web is processed 72 with a second bonding material web to form a second bonding surface of the membrane web.

The first bonding surface of the membrane web is processed 74 together with a first web of a gasket material to form gaskets on the first bonding surface of the membrane web. The second bonding surface of the membrane web is processed 76 with a second gasket material web to form gaskets on the second bonding surface of the membrane web.

The first bonding surface of the membrane web is further processed 78 together with FTL material portions to form a first fuel cell sub-assembly web surface. The second bonding surface of the membrane web is processed 80 together with FTL material portions to form a second fuel cell sub-assembly web surface.

The FTL material portions are preferably provided from first and second FTL material webs which are processed with the first and second bonding surfaces of the membrane web to form the first and second fuel cell sub-assembly web surfaces, respectively. The first and second fuel cell sub-assembly web surfaces formed on first and second surface of the membrane web define a web of MEA structures, such as that shown as MEA 37 in FIGS. 2-3.

The fuel cell sub-assembly web is transferred 82 for further processing, such as to a winding process to produce a fuel cell sub-assembly roll-good or to a singulation process to produce singulated fuel cell sub-assembly sheets. It is noted that a liner is typically in contact with the otherwise exposed bonding material surfaces of the membrane web surfaces for enhancing handling and transportability.

Figure 7:
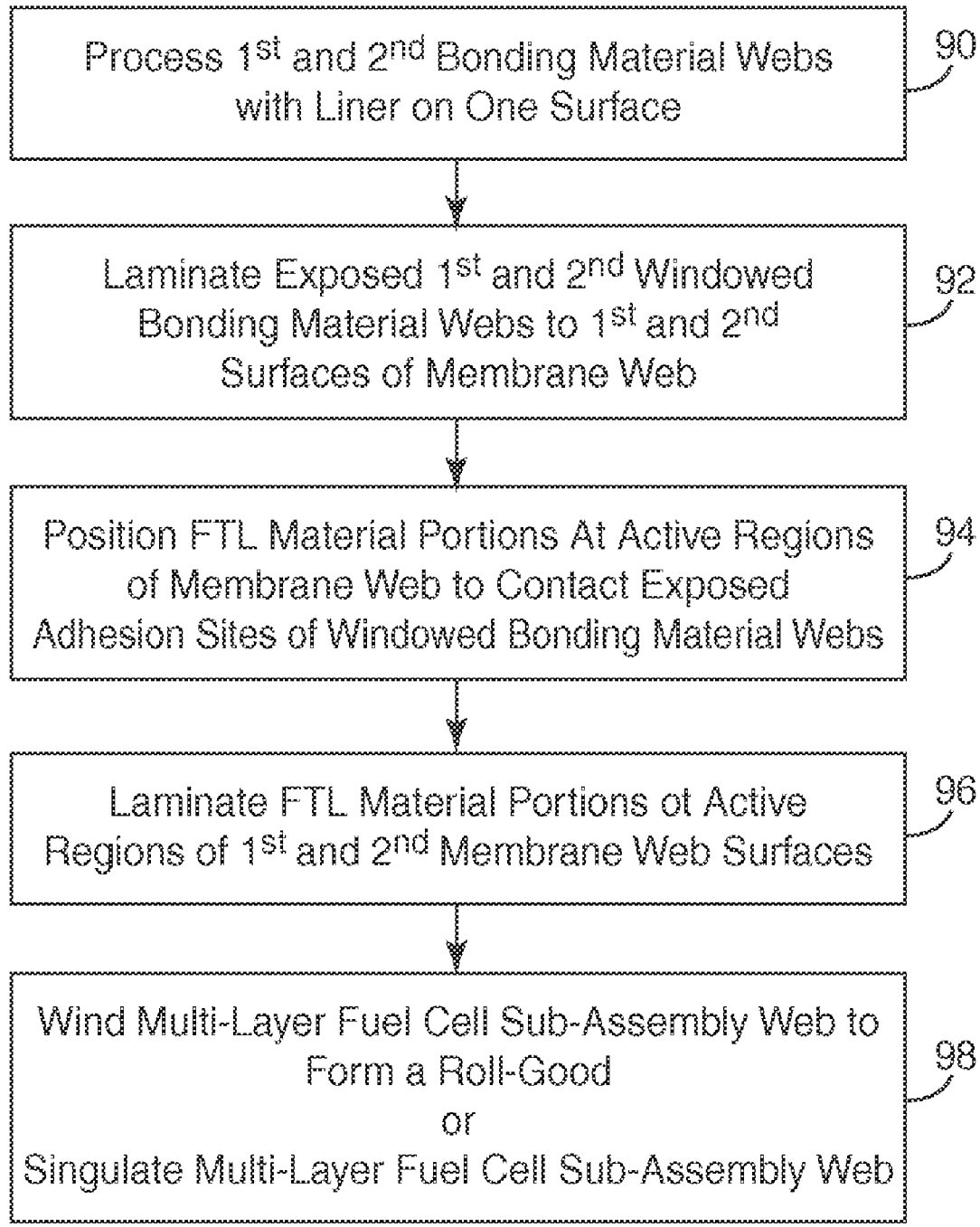

FIG. 7 illustrates various processes for producing a web of fuel cell sub-assemblies, such as MEAs, in accordance with another embodiment. According to this approach, first and second bonding material webs each with windowed sections are provided 90. A liner is provided on one surface of the first and second bonding surfaces, respectively. The exposed surfaces of the windowed first and second bonding material webs are laminated 92 to first and second surfaces of a membrane web. FTL material portions are positioned 94 at active regions of the membrane web such that the FTL material portions will contact exposed bonding sites within the windows of the bonding material webs.

The FTL material portions are then laminated 96 to the active regions of the first and second surfaces of the membrane web, thus forming a web of MEA structures, such as that shown as MEA 35 in FIG. 4. The multi-layer fuel cell sub-assembly web is further processed 98 to produce a fuel cell sub-assembly roll-good or singulated fuel cell sub-assembly sheets.

Figure 8:
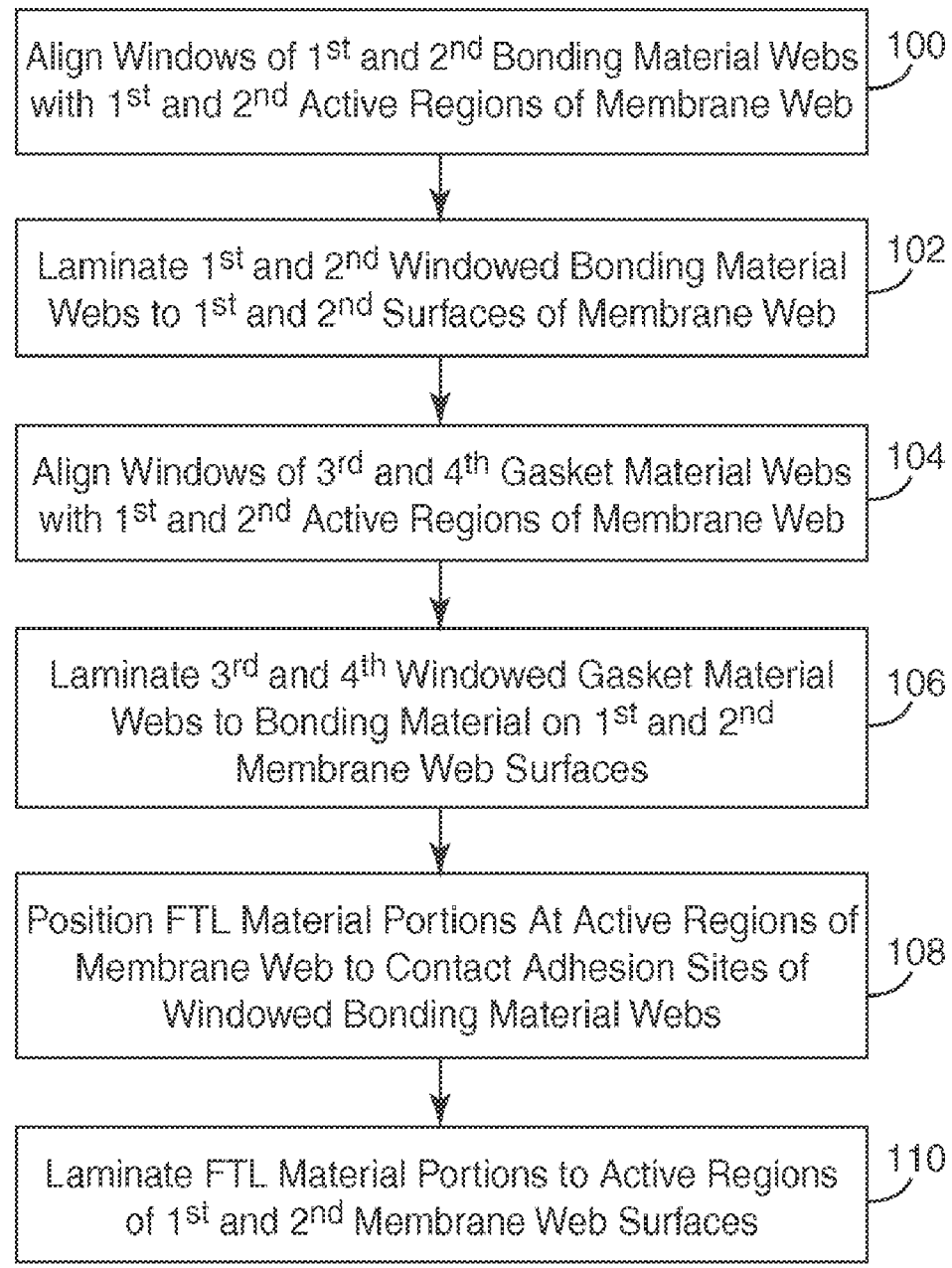

FIG. 8 illustrates various processes for producing a web of fuel cell sub-assemblies which incorporates gasket layers in accordance with a further embodiment of the present invention. According to this embodiment, the windows of first and second bonding material webs are aligned 100 with active regions of a membrane web. The windowed first and second bonding material webs are laminated 102 to respective first and second surface of a membrane web. The windows of third and fourth gasket material webs are aligned 104 with first and second active regions of the membrane web. The third and fourth windowed gasket material webs are laminated 106 to the bonding material on the first and second membrane web surfaces.

FTL material portions are positioned 108 at the active regions of the first and second membrane web surfaces to contact bonding sites defined within the windows of the first and second bonding material webs. The FTL material portions are then laminated 110 to the active regions of the first and second membrane web surfaces. The processes depicted in FIG. 8 can be employed to the produce an MEA which incorporates gasket material layers, such as MEA 37 illustrated in FIGS. 2 and 3. As in preceding embodiments, the multi-layer fuel cell sub-assembly web produced in accordance with FIG. 8 can be further processed to produce a fuel cell sub-assembly roll-good or singulated fuel cell sub-assembly sheets.

Figure 9:
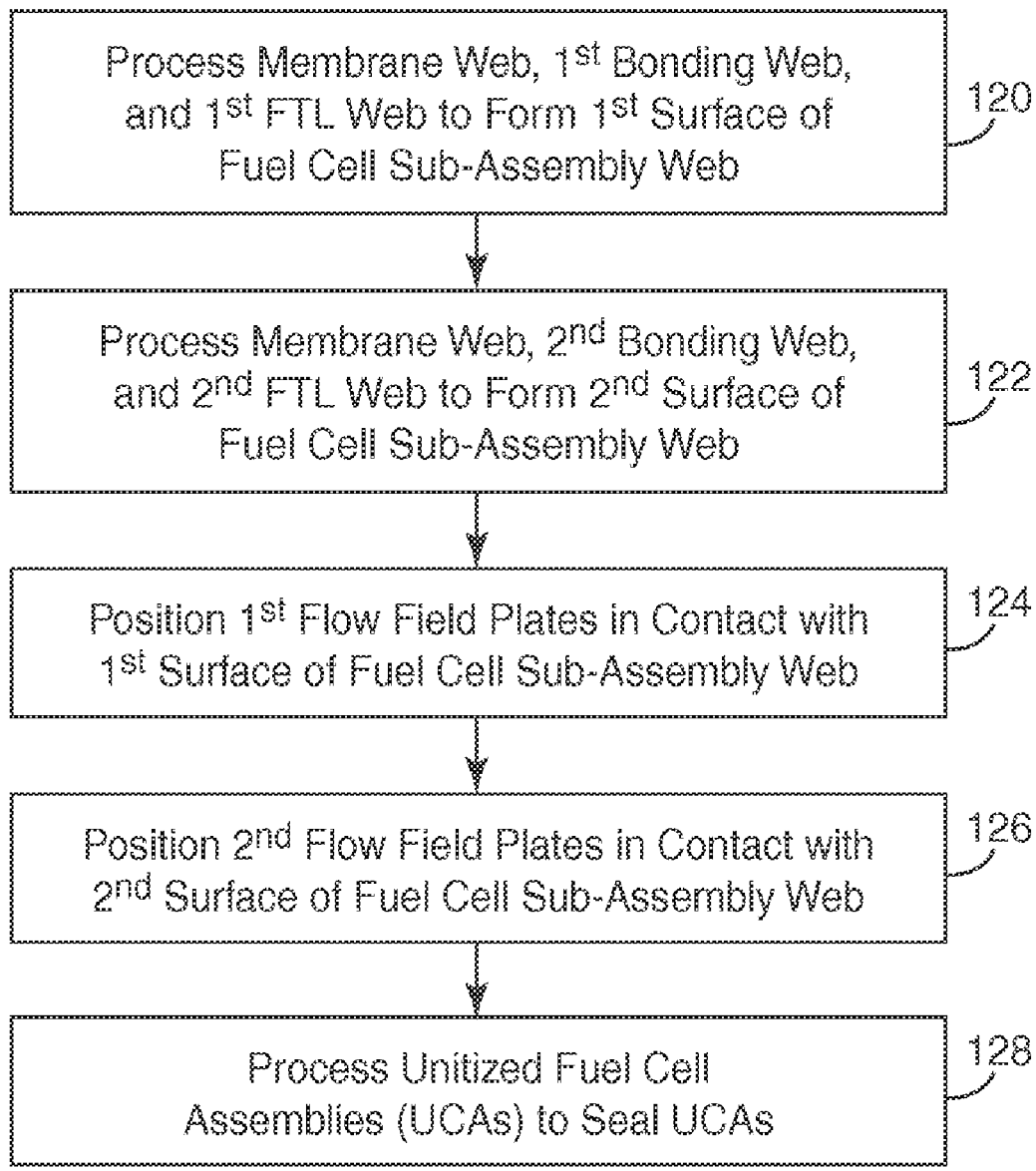

FIG. 9 illustrates various processes involving the production of unitized fuel cell assemblies or UCAs in accordance with an embodiment of the present invention. According to this approach, a membrane web, a first bonding material web, and a first FTL web are processed 120 to form a first surface of a fuel cell sub-assembly web. The membrane web, a second bonding material web, and a second FTL web are processed 122 to form a second surface of the fuel cell sub-assembly web.

A series of first flow field plates (e.g., monopolar or bipolar) is positioned 124 for contacting the first surface of the fuel cell sub-assembly web. A series of second flow field plates is positioned 126 for contacting the second surface of the fuel cell sub-assembly web. In particular, pairs of first and second flow field plates are positioned for contacting individual fuel cell sub-assemblies formed on the fuel cell sub-assembly web. The pairs of first and second flow field plates and individual fuel cell sub-assemblies are processed 128 to form unitized fuel cell assemblies, such as a web of UCAs.

The UCAs, in web form or singulated form, can be further processed to seal individual UCAs, such as by use of a heated press procedure. The processes depicted in FIG. 9 can be employed to the produce a UCA of the type illustrated in FIG. 5. A web of such UCAs can be further processed to produce a UCA roll-good or singulated UCAs.

The processes described above are provided for illustrative purposes only, and are not intended to represent all possible processes for producing fuel cell assemblies, sub-assemblies, and UCAs coming within the scope of the present invention. Moreover, processes in addition to, or different from, those described above can be employed to produce fuel cell assemblies, sub-assemblies, and UCAs of the present invention. For example, the apparatuses and associated processes described below can be employed to produce fuel cell assemblies, sub-assemblies, and UCAs of the present invention.

Figure 10:
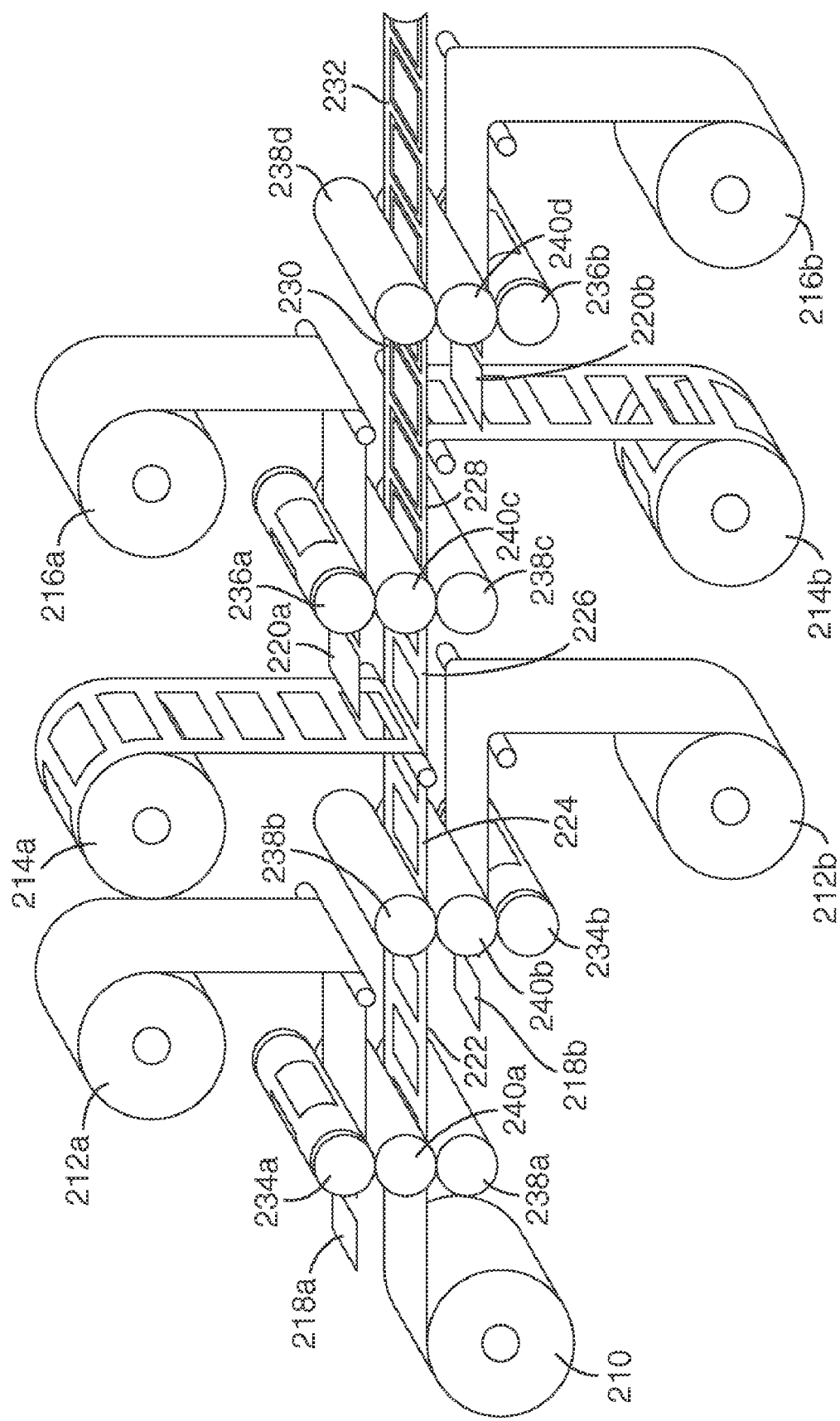
FIG. 10 shows an embodiment of an apparatus for priming a fuel cell membrane web and attaching various fuel cell components thereto in accordance with a continuous fuel cell manufacturing process of the present invention.
Figure 11:
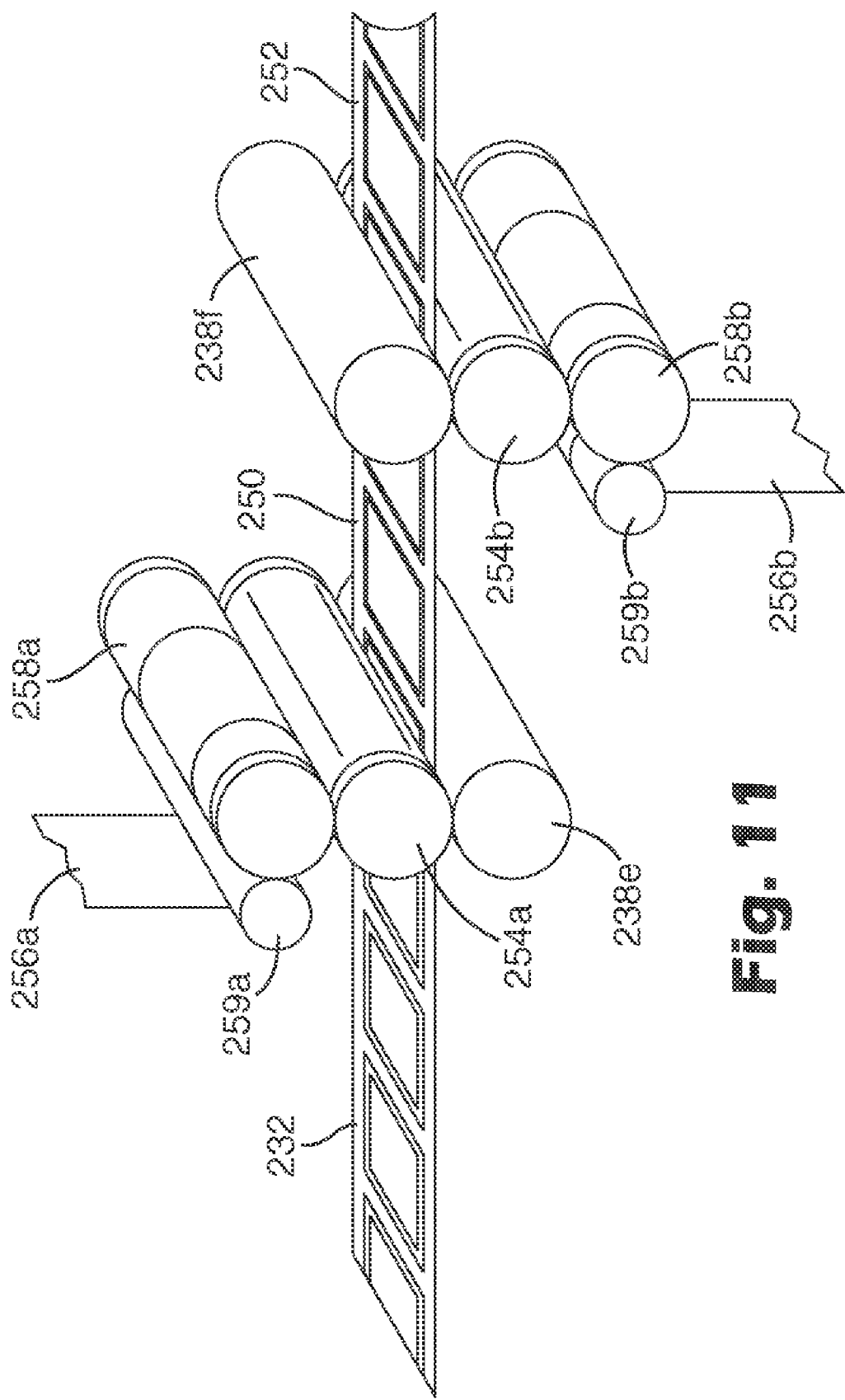
FIG. 11 shows an embodiment of an apparatus for attaching fluid transport layer (FTL) patches cut from FTL material webs to a primed membrane web in accordance with a continuous fuel cell manufacturing process of the present invention.
Figure 12:
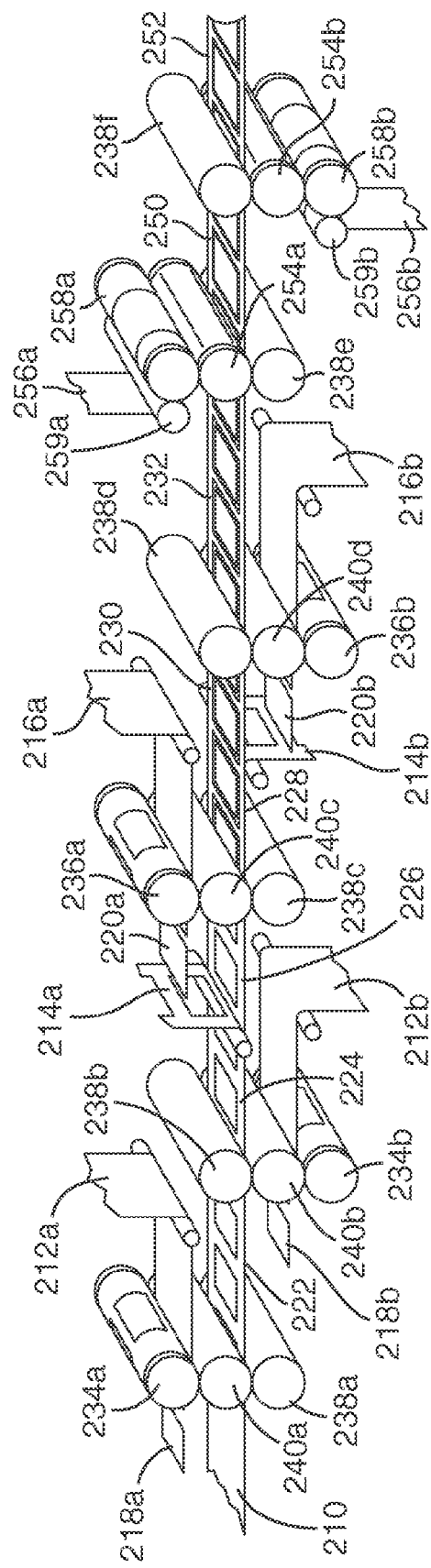
FIG. 12 illustrates a single apparatus that incorporates the apparatuses of FIGS. 10 and 11.

Turning now to FIGS. 10-12, there is illustrated apparatuses that process input webs of fuel cell materials and produce an output roll-good of fuel cell assemblies, sub-assemblies, or UCAs from such input webs. In general terms, the apparatuses of FIGS. 10-12 can produce a roll-good of fuel cells using roll-good fuel cell components. The apparatus of FIG. 10 provides a unique approach to priming an ionomer fuel cell membrane web for purposes of attaching various fuel cell components thereto, such as gasket and FTL components, in a continuous fuel cell manufacturing process. The apparatus of FIG. 11 provides a unique approach to attaching FTL material portions cut from FTL material webs to primed membranes in a continuous fuel cell manufacturing process. FIG. 12 illustrates a single apparatus that incorporates the apparatuses of FIGS. 10 and 11.

The apparatus of FIG. 10 laminates a patterned bonding agent from a liner to the fuel cell membrane web. The bonding material patterns preferably have substantially the same shape and area as the catalyst active areas of the fuel cell membrane web. In addition, according to one embodiment, gasket material is attached to the fuel cell membrane web subsequent to priming, which provides for excellent membrane web stability needed for continuous assembling of fuel cell components. The bonding material typically has a thickness of between about 1 and 6 mil.

As is shown in FIG. 10, a first roll of bonding material on a liner 212a is die-cut by a rotary die 234a and anvil roll 240a to produce a patterned (e.g., windowed) web of bonding material. Waste bonding material on the liner 218a is collected, such as by a vacuum process. The patterned bonding material web 212a is laminated to the top surface of a membrane web 210 via nip roll 238a. Hence, the laminated membrane web has a patterned bonding agent and liner on its top surface 222.

A second roll of bonding material on a liner 212b is also die-cut by a rotary die 234b and anvil roll 240b and laminated to the bottom face of the membrane web 210 via nip roll 238b, resulting in a liner/bonding material/membrane/bonding material/liner construction 224. Waste bonding material on the liner 218b is collected.

Optical sensors are preferably used to align the bonding material web patterns (e.g., windows) on both the top and bottom surfaces of the membrane web 210. The fiber optic sensors can, for example, detect the window of the bonding material pattern relative to the active regions on both sides of the membrane web 210.

Those skilled in the art will appreciate that several techniques and configurations can be employed to facilitate windowed material alignment using optical sensors or other types of sensing arrangements. By way of example, one optical sensor can be positioned to detect the pattern cut from die 234a after it is laminated at the nip formed by rolls 240a and 238a and before the nip formed by rolls 240b and 238b. A second optical sensor can be positioned to detect a mark on or attached to die roll 234b, where a mark corresponds to each die cavity.

Another optical sensing approach involves positioning a first sensor to detect a mark on or attached to die roll 234a, where the mark corresponds to each cavity, and positioning a second sensor to detect a mark on or attached to die roll 234b, where this mark corresponds to each cavity. Yet another approach involves mechanically tying rolls 234a and 234b together, with the ability to phase adjust roll 234b such that the die cuts are laminated to web 210 in register.

The liner of the patterned bonding material web is peeled off and wound on a waste liner roll 214a. Removal of this liner provides for a web 226 having an exposed bonding material/membrane/bonding material/liner construction. A roll of gasket material 216a is die-cut by a first rotary die 236a and anvil roll 240c, with waste gasket material 220a collected using vacuum or other approach. The die cut gasket material is roll laminated to the top surface of the exposed bonding material/membrane laminate 226 via nip roll 238c forming a gasket/bonding material/membrane/bonding material/liner laminate 228.

The liner of the bottom side of laminate 228 is also peeled off and wound on waste liner roll 214b, forming laminate 230. Laminate 230 has a gasket/bonding material/membrane/bonding material construction. A second roll of gasket material 216b is die-cut by a second rotary die 236b and anvil roll 240d, with waste gasket material 220b collected using a vacuum or other approach. The die cut gasket material is roll laminated to the bottom surface of the exposed bonding material of laminate 230 via nip roll 238d forming a gasket/bonding material/membrane/bonding material/gasket laminate 232.

In accordance with this embodiment, the apparatus of FIG. 10 produces a fuel cell membrane having a gasket material held to top and bottom surfaces of the membrane by use of a bonding material (e.g., bonding agent or an adhesive) exposed as a window pattern on the bare membrane. It is noted that some of the patterned bonding material remains exposed on the membrane because the gasket die-cut waste 220a, 220b is slightly larger than the bonding material die-cut waste 218a, 218b.

It is preferable that the first die-cut that produces laminate 230 be the master registration signal for the rest of the process. Each die would register to the web. The die roll should be driven separately from the anvil roll at each station since the anvil roll is also acting as a nip. It is noted that web tensions typically run in the 1 to 2 pli (pounds per lineal inch) range, but this tension range could be as low as from 0.1 pli to 3 pli.

The apparatus illustrated in FIG. 10 provides for several advantages over conventional fuel cell fabrication approaches. One advantage concerns a unique process of priming an ionomer membrane film (in roll-form) and concurrently attaching fuel cell components thereto to manufacture a multi-layer (e.g., 7-layer) fuel cell assembly in a continuous fuel cell manufacturing process. Another advantage concerns presence of a bonding material or agent on the membrane and exposed at the edge of the catalyst area due to use of a gasket material attached to the membrane having a window (die cut) larger than the exposed catalyst area. A further advantage concerns the roll-good membrane film material becoming more stable for continuous membrane processing due to the tougher gasket material attached to it.

Other advantages concern a bonding material exposed at the edge of the active catalyst area which is used to attach conductive fluid transport layer (FTL) material as part of a multi-layer fuel cell assembling process. Such bonding material exposed at the edge of active area can also be used to seal gases from leaking through the FTL of the fuel cell assembly.

FIG. 11 illustrates an apparatus that attaches roll-good FTL material to an already primed fuel cell membrane web in a continuous manufacturing process. For example, the apparatus of FIG. 10 discussed above and the apparatus of FIG. 11 can be combined to define a single apparatus for constructing a multi-layer fuel cell assembly using roll-good processing techniques. FIG. 12 is an illustration of single apparatus that combines the priming and FTL material attachment apparatuses of FIGS. 10 and 11.

The apparatus of FIG. 11 attaches roll-good FTL material to the membrane film at the edge of the catalyst active area. Since the FTL material is attached only at the edge of the catalyst active area, there is no decay in fuel cell performance. In general, FTL material portions are cut from an FTL material web by a rotary die. Each FTL material portion is held on the die surface by a vacuum and placed precisely within the gasket and/or bonding material window of the membrane web. Bonding material previously provided on the membrane web contacts the FTL material portions to affix the FTL material portions to the active regions of the membrane web.

The apparatus of FIG. 11 can be employed to place FTL material portions to a membrane web using a number of methods. It is assumed that laminate 232 (gasket/bonding material/membrane/bonding material/gasket laminate) shown in FIG. 10 is input to the apparatus shown in FIG. 11. According to one approach, rotary dies 254a, 254b each have a pattern that is the exact shape of the desired part. The dies 254a, 254b turn at a 1:1 web speed match, as well as a 1:1 die 254a/254b to anvil roll 258a/258b speed ratio, respectively.

A first web of FTL material 256a is fed to a first rotary die roll 254a and anvil roll 258a via nip roll 259a. The die roll 254a is preferably a vacuum die roll. The die roll 254a holds the cut FTL part via vacuum until it is laminated to the top surface of laminate 232 to produce an excellent catalyst/FTL interface in addition to a laminate 250 having an FTL/gasket/bonding material/membrane/bonding material/gasket construction. Waste FTL material is wound on a waste roll (not shown).

Similarly, a second web of FTL material 256b is fed to a second rotary die roll 254b and anvil roll 258b via nip roll 259b. The die roll 254b holds the cut FTL part via vacuum until it is laminated to the bottom surface of laminate 250 to produce laminate 252. Laminate 252 has an FTL/gasket/bonding material/membrane/bonding material/gasket/FTL construction.

According to another method using the apparatus of FIG. 11, a rotary die 254a/254b and a special anvil roll 258a/258b are configured as a matched set. In this regard, the die 254a/254b and anvil roll 258a/258b are designed to allow the die roll surface speed to anvil roll surface speed ratio to be equivalent to the fuel cell part size to FTL part size ratio.

To achieve this objective, the FTL webs 256a, 256b are held on respective anvil rolls 258a, 258b by vacuum, and FTL web speed is controlled by the nip formed by respective anvil rolls 258a, 258b and rubber nip rolls 259a, 259b. The die rolls 254a, 254b turn at a higher surface speed, but do not pull the respective FTL webs 256a, 256b. When a die blade comes around, the FTL webs 256a, 256b are cut and the cut FTL parts are held on the die rolls 254a, 254b by vacuum. There is a separation between the cut FTL and the FTL web 256a, 256b due to the surface speed difference between the respective die and anvil rolls, 254a/254b and 258a/258b. The die blades are registered to the membrane web (232 and 250) by fiber optic sensors and servo controlled die stations.

Each cut FTL part is placed in the center of an associated gasket window. In one configuration, registration of the FTL parts within the center of the gasket windows is monitored by optical sensors, such as fiber optic sensor. By way of example, and with reference to FIG. 11, one sensor would pick up windows on the web 232 and a second sensor would be positioned to pick up a mark on or attached to the die roll 254a where the mark corresponds to each die cavity. A third sensor would be positioned to pick up a mark on or attached to the die roll 254b.

According to a preferred approach, the window cut in the bonding material web is the smallest in size. The gasket window is the largest in size, and the FTL patch is cut to fit inside the gasket window and completely cover the edge of the bonding material window. Each FTL patch contacts bonding sites protruding inwardly from the inner periphery of a corresponding bonding material window.

The FTL attachment apparatus illustrated in FIG. 11 advantageously cuts roll-good FTL material, holds a die-cut FTL piece by a vacuum, and precisely places the FTL piece within a window of a fuel cell gasket in a continuous fabrication process. It may be desirable to attach one or more layers of thin foam material (e.g., having a thickness of 2 mils) to the rotary steel die of the die stations such that vacuum can be better maintained on the FTL material when it is cut. It may be further desirable to use only outer holes of the rotary die to enhance performance of the vacuum die. It is noted that the protrusions of the edges of the die-cut FTL patches should be controlled and maintained to minimum levels so that no tearing of the membrane occurs when attaching the FTL to the gasket window of the membrane.

Figure 13:
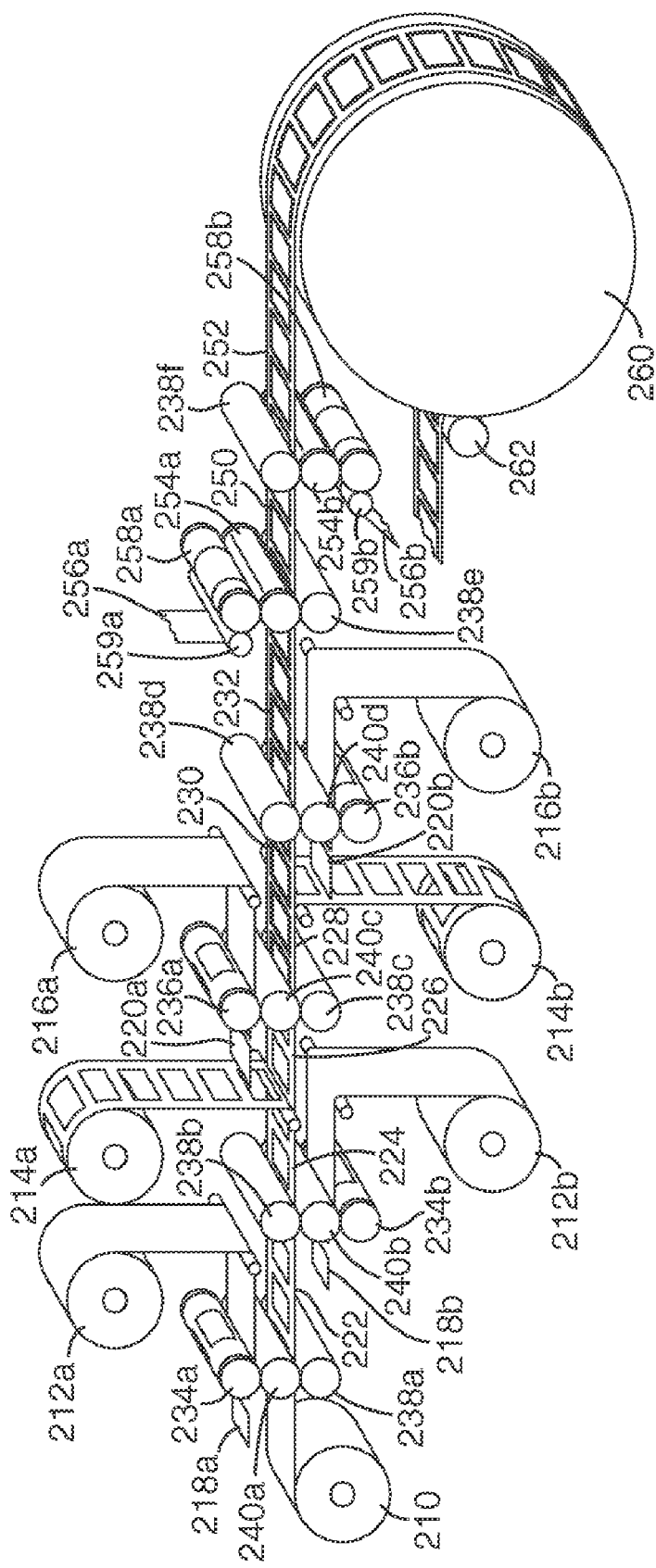
FIG. 13 illustrates an embodiment of a sealing apparatus for sealing fuel cell assemblies and sub-assemblies in accordance with a continuous fuel cell manufacturing process of the present invention.

FIG. 13 illustrates an additional web processing station that can be used to promote sealing of the laminate 252 produced at the output of the apparatus shown in FIG. 12. It is noted that the apparatus components shown left of drum 260 in FIG. 13 are those depicted in FIG. 12. As discussed previously, the laminate 252 has an FTL/gasket/bonding material/membrane/bonding material/gasket/FTL construction. In the embodiment illustrated in FIG. 13, a drum 260 having a relatively large radius is preferably heated to an appropriate temperature sufficient to activate the bonding material of the laminate 252 and also to provide for a good catalyst/FTL interface. A roll 262 and the drum 260 cooperate to place the laminate 252 under tension as the laminate 252 rolls about the outer surface of the drum. The tension developed between the laminate 252 and the drum 260 serves to place the laminate structure under a controlled amount of pressure during the heat sealing process.

The size of the drum 260, speed of laminate rotation, total contact time between the laminate 252 and drum surface, and amount of tension are among several processing parameters that can be selected to achieve an appropriate level of laminate sealing and also an excellent catalyst/FTL interface. These processing parameters can be adjusted to optimize laminate sealing based on the particular materials used in the laminate construction. It can be appreciated that a sealing apparatus of the type illustrated in FIG. 13 provides for enhanced flexibility in terms of fuel cell material selection and performance characteristics. It will be appreciated that other sealing apparatuses can be employed to further process the laminate 252. Other such sealing apparatuses include those that employ UV curing, heat (e.g., curing ovens), RF activation, and e-beam activation, for example.

Figure 14:
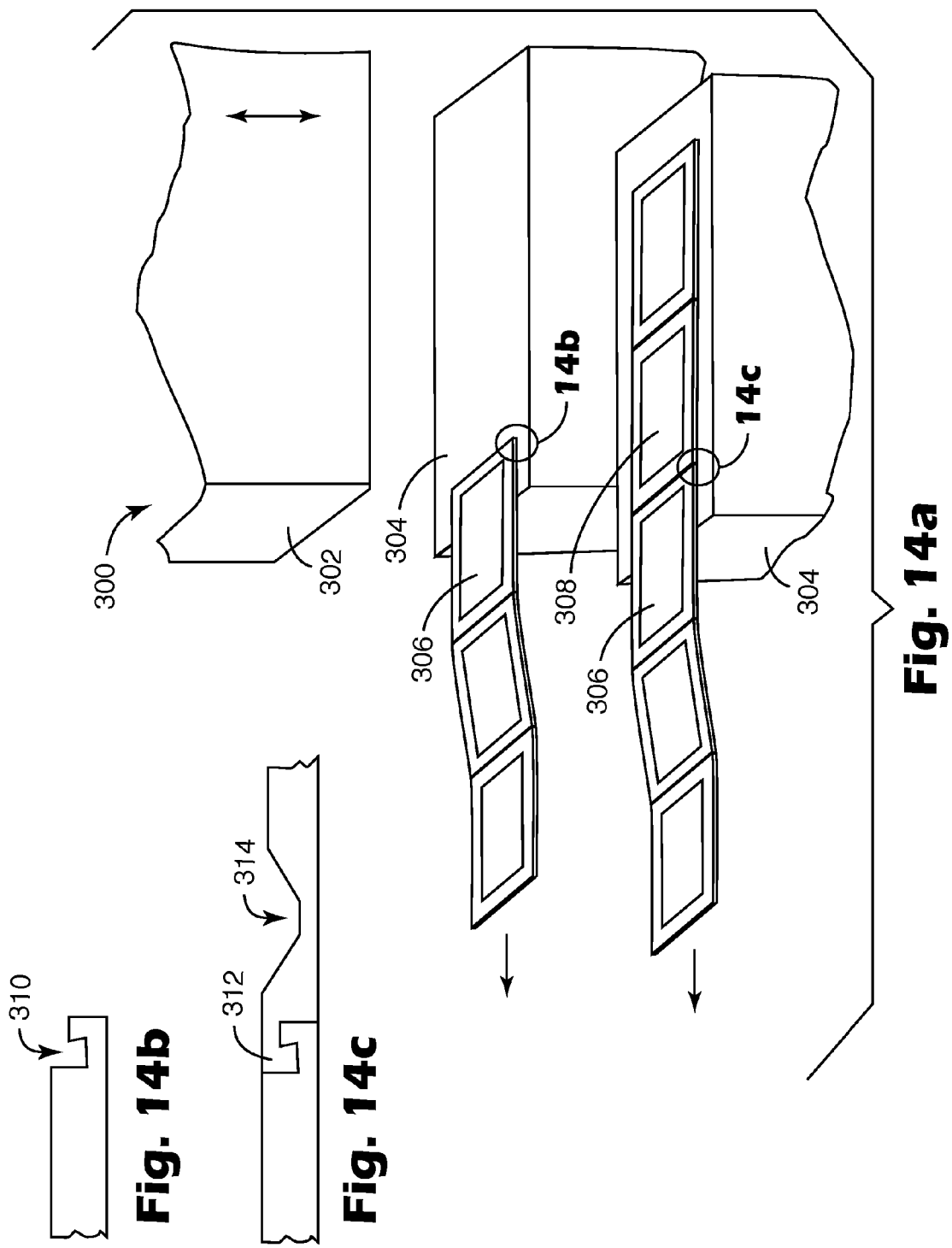
FIG. 14A is an illustration of a molding station and process for producing flow field plates in accordance with a continuous fuel cell manufacturing process of the present invention.
FIGS. 14B and 14C illustrate features of a molded living hinge arrangement for producing a continuous web of flow field plates in accordance with a continuous fuel cell manufacturing process of the present invention.

As was discussed previously, a roll-good fuel cell web, such as one produced in accordance with the above-described embodiments, can be further processed by a molding station to encase individual fuel cell assemblies of the fuel cell web between pairs of flow field plates. In one approach, and as shown in FIG. 14A, a molding station 300 can be configured to receive a web of fuel cell assemblies. The molding station 300 includes two mold halves, 302 and 304, which move relative to one another via conventional mold/clamp mechanisms. In the embodiment shown in FIG. 14A, the upper mold half 302 is movable in the vertical plane relative to the stationary lower mold half 304. The lower and upper mold halves in this configuration include the mold cavities. It is noted that the mold halves can include a single mold cavity or multiple mold cavities.

In general, one or more fuel cell assemblies of the input web are transported between the upper and lower mold halves 302, 304. Each fuel cell assembly is registered with a mold cavity. Registration sensors, such as optical sensors, can be used to ensure proper alignment of the fuel cell assemblies with their respective mold cavities. The upper mold half 302 is moved into engagement with the lower mold half 304 under compressive forces produced by a clamp mechanism of the molding station 300. A material appropriate for the construction of flow field plates is introduced into the mold cavities. The material may be injected or added as a preform, for example.

After completion of the shot and expiration of an appropriate curing duration, the upper mold half 302 is moved upwardly from, and out of engagement with, the lower mold half 304. The encased fuel assemblies (i.e., UCA) are then removed from the mold cavities of the lower mold half 304. It is noted that a release agent can be sprayed or otherwise dispensed onto the surface of the upper and lower mold cavity halves to promote easy separation of the molded UCAs from the mold cavities. It is further noted that color agents, UV protection agents, and other agents can be introduced into the injected material or sprayed into the mold cavities to enhance the aesthetics and/or durability of the molded UCAs.

The input fuel cell web can be received in roll-good form produced by an automated continuous web processing approach as described above. It is understood, however, that an in-line flow field plate molding approach of the present invention can be used to encase roll-good or singulate fuel cell assemblies produced in other manners.

In another approach, for example, the input fuel cell web to the molding station 300 can be the laminate 252 produced at the output of the apparatus shown in FIG. 12 or FIG. 13. According to this approach, an intermediary staging station may be required to coordinate any web speed differential between the output of the apparatuses of FIG. 12 or FIG. 13 and the input of the molding station 300. Preferably, any such speed differential can be minimized by matching molding rates (which include shot time and curing duration) at the molding station 300 with web processing rates of the apparatuses of FIG. 12 or FIG. 13.

According to another embodiment, the molding station 300 can be configured to mold flow field plates into a continuous web, with a living hinge, carrier strip, or other interlocking arrangement, such as a tapered hole and plug arrangement, provided between adjacent plates. The molding material can also perform the gasket function around the manifolds of the flow field plates.

As can be seen in FIGS. 14B and 14C, the molds can be designed to allow for an overmold of the material onto itself to form a bond with the previously molded plate, thus forming a continuous web of flow field plates. FIG. 14B shows a first portion 310 of the living hinge at the rear of flow field plate 306 at a time $t_1$ in the molding station 300. FIG. 14C shows a second portion 312 of the living hinge which is created to engage the first portion 310 by overmolding material from the next adjacent flow field plate 308 into the first portion 310 of the previously molded flow field plate 306 at a time $t_2$ in the molding station. The living hinge geometry (314) shown in FIG. 14C allows for connectivity between adjacent flow field plates and flexing of the web. The depression 314 is formed between adjacent flow field plates to enhance flexing of the web and singulation of individual UCAs from the web of UCAs.

Figure 15:
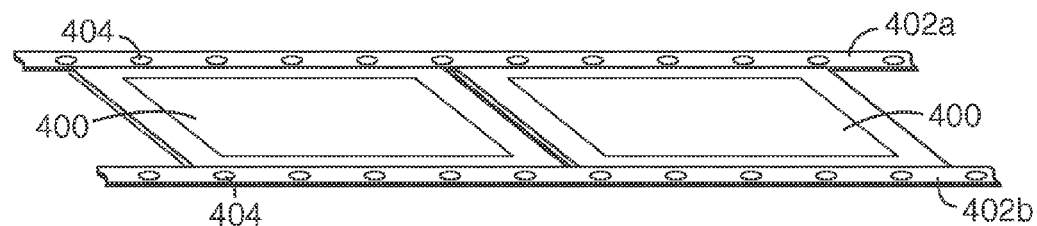
FIG. 15 illustrates features of a molded carrier strip arrangement for producing a continuous web of flow field plates in accordance with a continuous fuel cell manufacturing process of the present invention.

In accordance with another approach, the molding station 300 is configured with mold halves that produce carrier strips to connect adjacent plates in a continuous web, as is shown in FIG. 15. In one approach, the flow field plates 400 and carrier strips 402a, 402b are molded using a first shot. After this first shot, a narrow gap separates the flow field plates 400 and carrier strips 402a, 402b. A second overmold shot injects material into this narrow gap to connect the flow field plates 400 with the carrier strips 402a, 402b. Registration holes can be formed in the carrier strips 402a, 402b to facilitate subsequent winding and/or singulation processes.

Figure 16A:
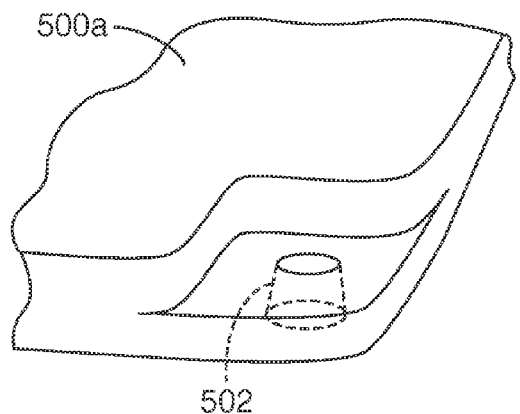
FIGS. 16A and 16B illustrate features of another molded interlocking arrangement for producing a continuous web of flow field plates in accordance with a continuous fuel cell manufacturing process of the present invention.
Figure 16B:
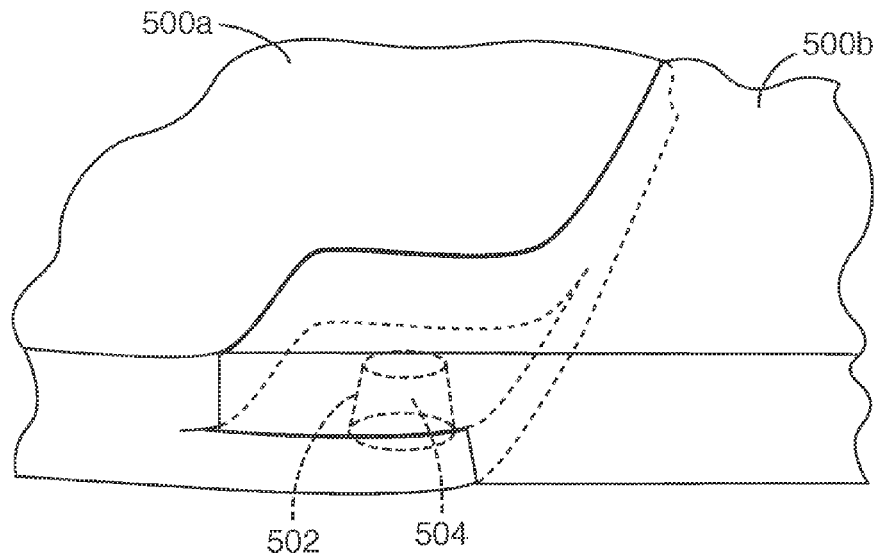

FIGS. 16A and 16B illustrate yet another approach to molding flow field plates to form a continuous web. According to this approach, a reverse taper hole 502 is molded into a corner of a first flow field plate 500a during a first shot. During a second overmold shot that forms an adjacent flow field plate 500b, material from the second shot is flowed into at least the reverse taper hole 502 of the previously molded plate 500a to form a plug 504. This hold and plug interlocking arrangement can be formed at each corner of adjacent flow field plates 500a, 500b.

A web of flow field plates produced in accordance with the present invention can be rolled up as a roll-good for future assembly. Alternatively, and as shown in FIG. 17, webs of flow field plates can be fed directly into a UCA assembly line, in which case two presses may be used, each making a web for each side of the UCA as show in FIG. 17.

The UCA assembly station 600 shown in FIG. 17 includes a first molding station 601 that produces a first web of flow field plates 606, and a second molding station 603 that produces a second web of flow field plates 608. An MEA web 606 is transported so that individual MEAs 604a of the MEA web 604 register with a pair of flow field plates 606a, 608a from the first and second flow field plate webs 606, 608. After encasing the MEAs 606a between respective pairs of flow field plates 606a, 608a, the resulting UCA web 610 may be further processed by a sealing stations and/or a winding station. A web 610 of sealed UCAs can subsequently be subject to a singulation process to separate individual UCAs from the UCA web 610.

The foregoing description of the various embodiments of the invention has been presented for the purposes of illustration and description. It is not intended to be exhaustive or to limit the invention to the precise form disclosed. Many modifications and variations are possible in light of the above teaching. For example, the various rotary cutting, laminating, and transporting processes described with reference to the accompanying figures can instead be accomplished using non-rotary methods and apparatuses, such as by use of flat die processes and apparatuses, step and repeat processes and apparatuses, pick and place processes and apparatuses, intermittent motion processes and apparatuses, and index and stamp cut processes and apparatuses as are known in the art, for example. It is intended that the scope of the invention be limited not by this detailed description, but rather by the claims appended hereto.

What we claim is:

1. A method of continuously producing a multiple layer web of fuel cell material for use with and between a pair of flow field plates or between gasket layers, comprising:
    cutting a first web comprising bonding material to produce spaced apart first windows in the first web, the first windows comprising bonding sites provided along a periphery of the first windows;
    cutting a second web comprising bonding material to produce spaced apart second windows in the second web, the second windows comprising bonding sites provided along a periphery of the second windows;
    providing a web comprising a fuel cell membrane having active regions disposed on respective first and second surfaces of the membrane web;
    laminating a first surface of the first bonding material web to the first surface of the membrane web so that the active regions of the first surface of the membrane web are positioned within the first windows;
    laminating a first surface of the second bonding material web to the second surface of the membrane web so that the active regions of the second surface of the membrane web are positioned within the second windows; and
    laminating fluid transport layer (FTL) material portions cut from fourth and fifth webs comprising FTL material to the active regions of the respective first and second surfaces of the membrane web, each of the FTL material portions covering the bonding sites of the respective first and second windows.

2. The method according to claim 1, wherein second surfaces of the first and second bonding material webs respectively comprise a release liner.

3. The method according to claim 2, further comprising:
    removing the release liner on the respective second surfaces of the first and second bonding material webs; and
    adheringly engaging a flow field plate or a gasket layer with each of the second surfaces of the first and second bonding material webs.

4. The method according to claim 1, wherein all of the laminating processes comprise rotatable laminating processes.

5. The method according to claim 1 wherein at least some of the laminating processes comprise rotatable laminating processes.

6. The method according to claim 1, wherein all of the cutting processes comprise rotatable laminating processes.

7. The method according to claim 1, wherein at least some of the cutting processes comprise rotatable laminating processes.

8. The method according to claim 1, wherein one of the fourth and fifth webs of FTL material comprises an anode catalyst and the other of the fourth and fifth FTL material webs comprises a cathode catalyst.

9. The method according to claim 1, wherein the active regions of one of the first and second membrane web surfaces comprises an anode catalyst, and the active regions of the other of the first and second membrane web surfaces comprises a cathode catalyst.

10. The method according to claim 1, further comprising rotatably cutting the fourth and fifth FTL material webs to produce the FTL material portions.

11. The method according to claim 1, further comprising rotatably moving the FTL material portions under vacuum when laminating the FTL material portions to the active regions of the first and second membrane web surfaces.

12. The method according to claim 1, further comprising optically sensing positions of the first and second bonding material windows relative to the active regions of the first and second membrane web surfaces when laminating the first and second bonding material webs to the first and second membrane web surfaces.

13. The method according to claim 1, further comprising optically sensing positions of the FTL material portions relative to active regions of the first and second membrane web surfaces when laminating the FTL material portions to the active regions of the first and second membrane web surfaces.

14. The method according to claim 1, further comprising winding the multiple layer web of fuel cell material and a liner into a roll.

15. The method according to claim 1, further comprising singulating the multiple layer web of fuel cell material to produce a plurality of discrete fuel cell material sheets.

16. The method according to claim 1, wherein all of the laminating processes associated with the first and second surfaces of the membrane web are effected substantially concurrently.

17. The method according to claim 1, wherein at least some of the laminating processes associated with the first and second surfaces of the membrane web are effected substantially concurrently.

18. The method according to claim 1, further comprising sealing the produced web of fuel cell material using heat and pressure.

19. The method according to claim 1, further comprising rotatably sealing the produced web of fuel cell material using heat and pressure.

20. A method of continuously producing multiple layer fuel cell assemblies, comprising:
   producing a continuous membrane electrode assembly (MEA) web, comprising:
      providing a first web comprising bonding material having spaced apart first windows, the first windows comprising bonding sites provided along a periphery of the first windows;
      providing a second web comprising bonding material having spaced apart second windows, the second windows comprising bonding sites provided along a periphery of the second windows;
      providing a web comprising a fuel cell membrane having active regions disposed on respective first and second surfaces of the membrane web;
      laminating a first surface of the first bonding material web to the first surface of the membrane web so that the active regions of the first surface of the membrane web are positioned within the first windows;
      laminating a first surface of the second bonding material web to the second surface of the membrane web so that the active regions of the second surface of the membrane web are positioned within the second windows;
      laminating fluid transport layer (FTL) material portions cut from fourth and fifth webs comprising FTL material to the active regions of the respective first and second surfaces of the membrane web, each of the FTL material portions covering the bonding sites of the respective first and second windows;
   providing a continuous web of first flow field plates;
   providing a continuous web of second flow field plates; and
   encasing each of the MEAs between a respective pair of the first and second flow field plates.

21. The method according to claim 20, further comprising registering each of the webs of first and second how held plates with the MEA web.

22. The method according to claim 20, wherein providing the continuous webs of first and second flow field plates comprises molding a material to form the continuous webs of first and second flow field plates substantially concurrently with respect to producing the MEAs.

23. The method according to claim 22, wherein the material comprises a carbon/polymer composite material.

24. The method according to claim 20, wherein providing the continuous webs of first and second flow field plates comprises molding a material to form an interlocking arrangement between adjacent ones of the first flow field plates and between adjacent ones of the second flow field plates.

25. The method according to claim 20, wherein providing the continuous webs of first and second flow field plates comprises molding a material to form a living hinge between adjacent ones of the first flow field plates and between adjacent ones of the second flow field plates.

26. The method according to claim 20, wherein providing the continuous webs of first and second flow field plates comprises molding a material to form carrier strips along opposing sides of the first flow field plates and along opposing sides of the second flow field plates.

27. The method according to claim 20, wherein providing the continuous webs of first and second flow field plates comprises molding a material to form a plug and hole interlocking arrangement at corners of adjacent ones of the first flow field plates and at corners of adjacent ones of the second flow field plates.

28. The method according to claim 20, further comprising winding the multiple layer fuel cell assemblies into a roll.

29. The method according to claim 20, further comprising subjecting the multiple layer fuel cell assemblies to heat and pressure to seal the MEAs within the respective pair of first and second flow field plates.

30. The method according to claim 20, wherein one of the fourth and fifth webs of FTL material comprises an anode catalyst and the other of the fourth and fifth FTL material webs comprises a cathode catalyst.

31. The method according to claim 20, wherein one of the first and second membrane surfaces comprises an anode catalyst and the other of the first and second membrane surfaces comprises a cathode catalyst.

* * * * *

UNITED STATES PATENT AND TRADEMARK OFFICE
CERTIFICATE OF CORRECTION

PATENT NO.        : 7,722,684 B2
APPLICATION NO.   : 11/676586
DATED             : May 25, 2010
INVENTOR(S)       : David Robert Mekala It is certified that error appears in the above-identified patent and that said Letters Patent is hereby corrected as shown below:

Column 9
Line 29, delete "2002" and insert
-- 2002, under Attorney Docket 58218US002 -- therefor.

Column 20
Claim 5, Line 48, delete "claim 1" and insert -- claim 1, -- therefor.

Column 21
Claim 19, Line 34, delete "scaling" and insert -- sealing -- therefor.

Column 22
Claim 21, Line 12, delete "how held" and insert -- flow field -- therefor.

Signed and Sealed this

Ninth Day of November, 2010

David J. Kappos
*Director of the United States Patent and Trademark Office*